United States Patent
Hagihara et al.

(10) Patent No.: US 7,552,299 B2
(45) Date of Patent: Jun. 23, 2009

(54) DATA-PROCESSING APPARATUS, DATA-PROCESSING METHOD AND PROGRAM

(75) Inventors: Shiro Hagihara, Kanagawa (JP); Hisao Tanaka, Tokyo (JP); Hideki Ando, Kanagawa (JP); Masaki Hirose, Kanagawa (JP); Satoshi Katsuo, Kanagawa (JP); Takashi Furukawa, Kanagawa (JP); Takayoshi Kawamura, Kanagawa (JP); Motohiro Terao, Kanagawa (JP)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 10/738,793

(22) Filed: Dec. 16, 2003

(65) Prior Publication Data
US 2004/0130814 A1    Jul. 8, 2004

(30) Foreign Application Priority Data
Dec. 18, 2002   (JP)   .............................. 2002-366199

(51) Int. Cl.
*G06F 13/362* (2006.01)
(52) U.S. Cl. ........................................ 711/165; 711/166
(58) Field of Classification Search ........................ None
See application file for complete search history.

(56) References Cited
U.S. PATENT DOCUMENTS
5,745,771 A * 4/1998 Ohyama et al. ............. 710/262
5,748,585 A * 5/1998 Tsukamoto et al. ......... 369/47.23
5,966,352 A * 10/1999 Sawabe et al. .............. 386/126
6,658,196 B2    12/2003 Sakai et al.
7,016,597 B2 *  3/2006 Gotoh et al. .................. 386/52

FOREIGN PATENT DOCUMENTS
| DE | 19909367 | 9/2000 |
| EP | 0 903 742 | 3/1999 |
| EP | 1 065 665 | 1/2001 |

OTHER PUBLICATIONS

Liu J C et al: "Supporting random access on real-time retrieval of digital continuous media" Computer Communications, Elsevier Science Publishers BV, Amsterdam, NL. vol. 18, No. 3, Mar. 1, 1995 (Mar. 1, 1995), pp. 145-159, XP004032496 ISSN: 0140-3664.

* cited by examiner

*Primary Examiner*—Hyung S Sough
*Assistant Examiner*—Ngoc V Dinh
(74) *Attorney, Agent, or Firm*—Frommer Lawrence & Haug LLP; William S. Frommer; Thomas F. Presson

(57) ABSTRACT

A real-time reproduction determination unit determines whether or not AV data recorded in recording areas on an optical disc can be reproduced in a real-time manner. If the AV data recorded on the optical disc cannot be reproduced in a real-time manner, a compile simulation unit and a compile execution unit respectively select extents from the AV data recorded on the optical disc and relocate the extents to a relocation area.

13 Claims, 22 Drawing Sheets

FIG. 3

| REPRODUCTION ORDER | FILE NAME | START TIME CODE (IN POINT) | END TIME CODE (OUT POINT) |
|---|---|---|---|
| 1 | File001 | B1 | E1 |
| 2 | File002 | B2 | E2 |
| 3 | File003 | B3 | E3 |

FIG. 4

ALLOCATION DESCRIPTOR
    EXTENT LENGTH: 4
    EXTENT POSITION: 100

ALLOCATION DESCRIPTOR
    EXTENT LENGTH: 3
    EXTENT POSITION: 152

ALLOCATION DESCRIPTOR
    EXTENT LENGTH: 6
    EXTENT POSITION: 208

⋮

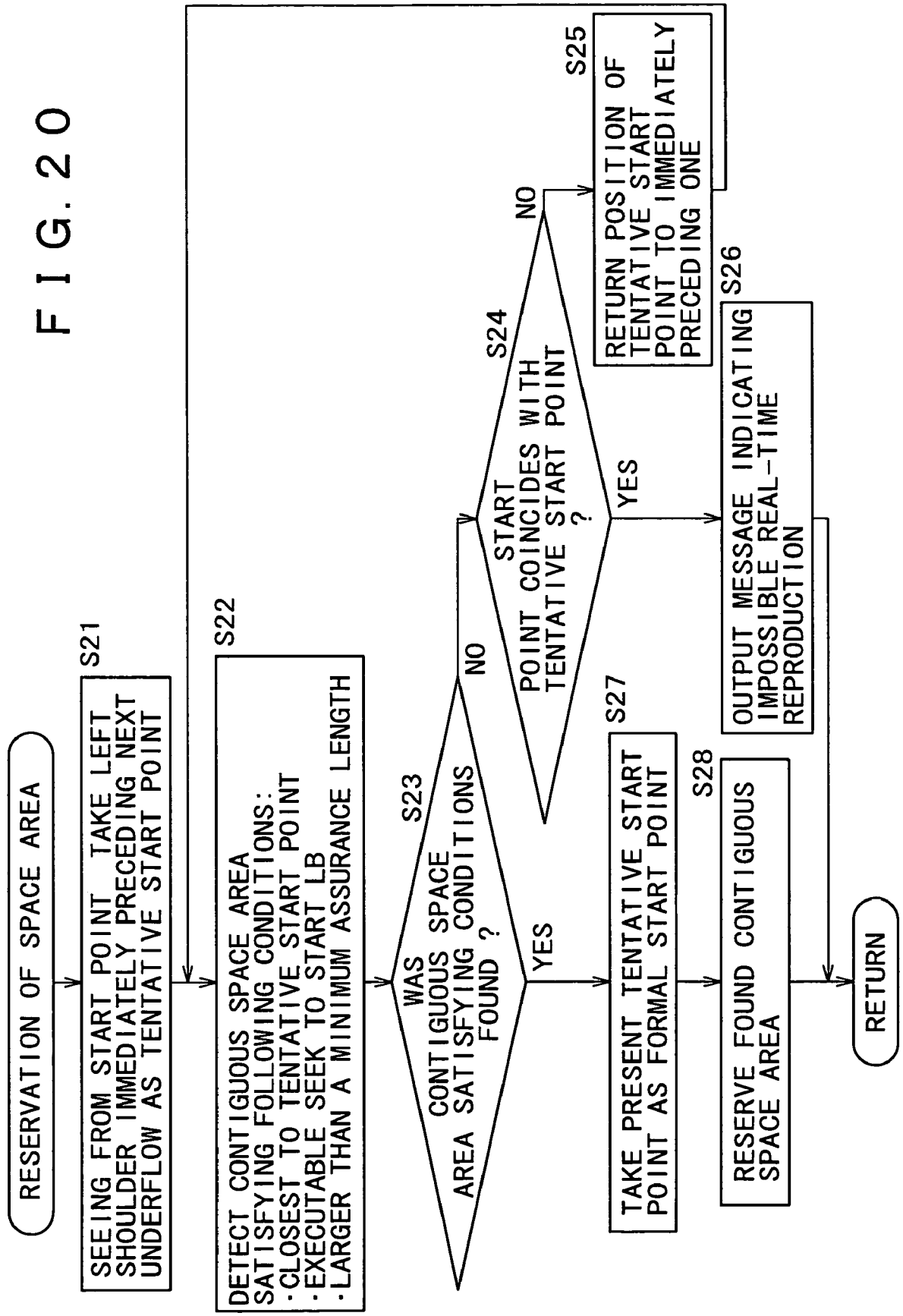

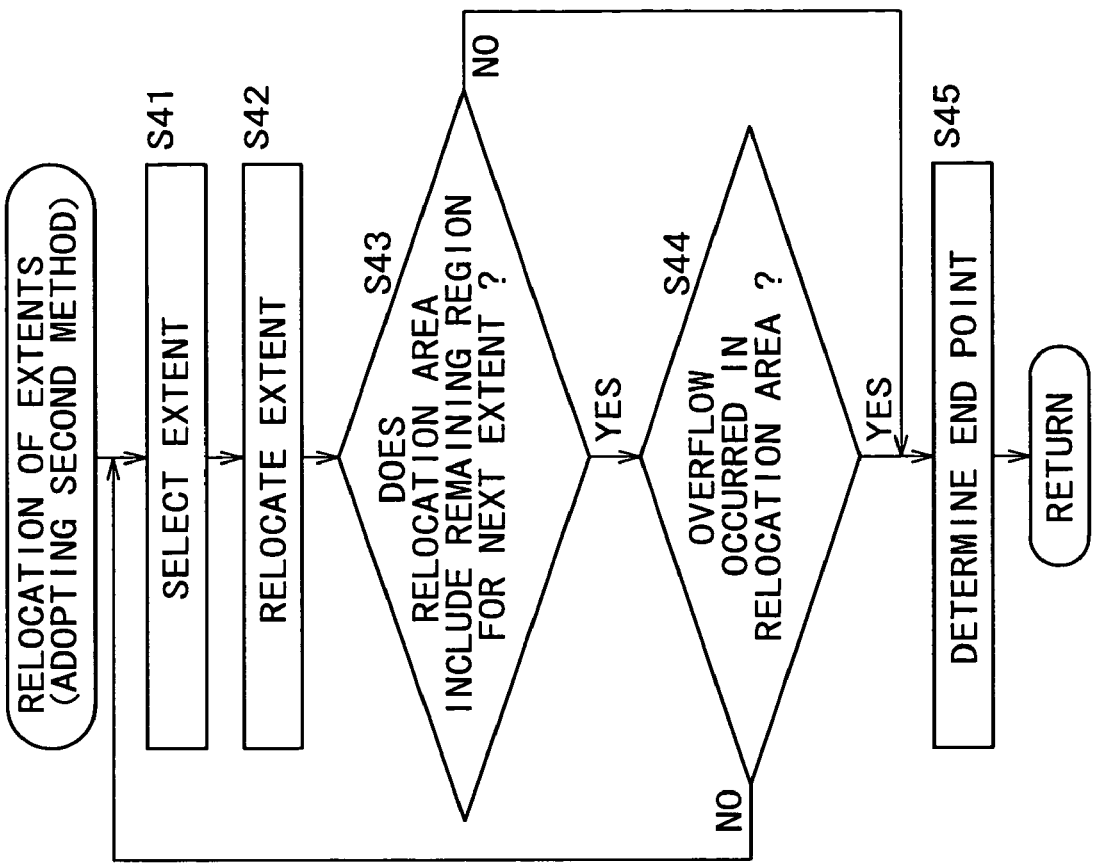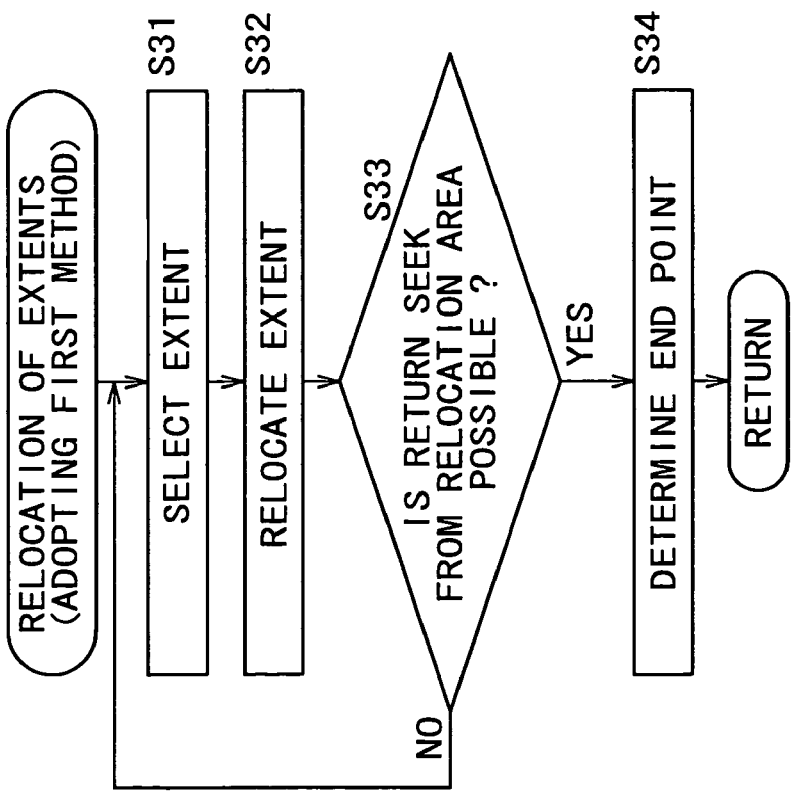

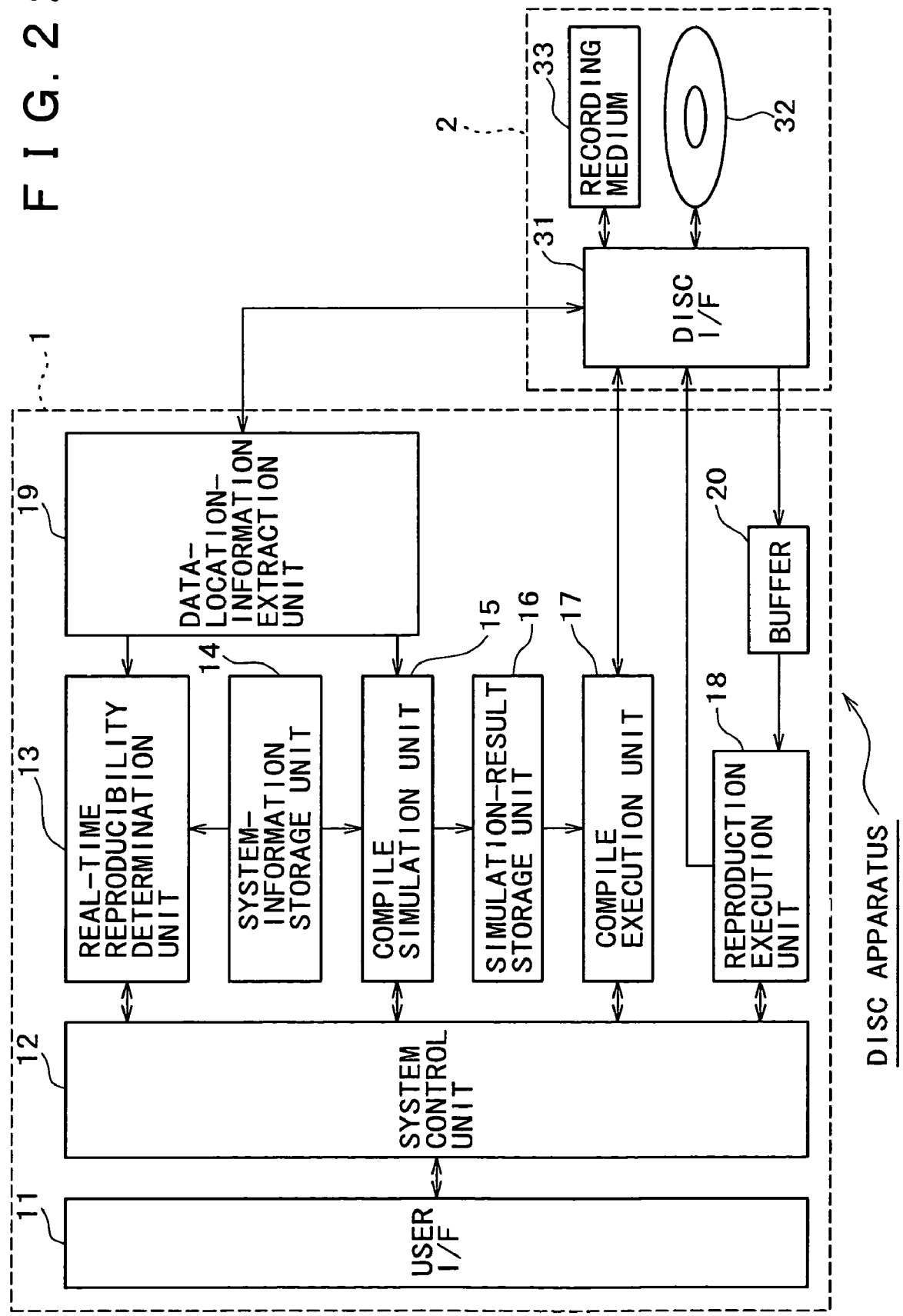

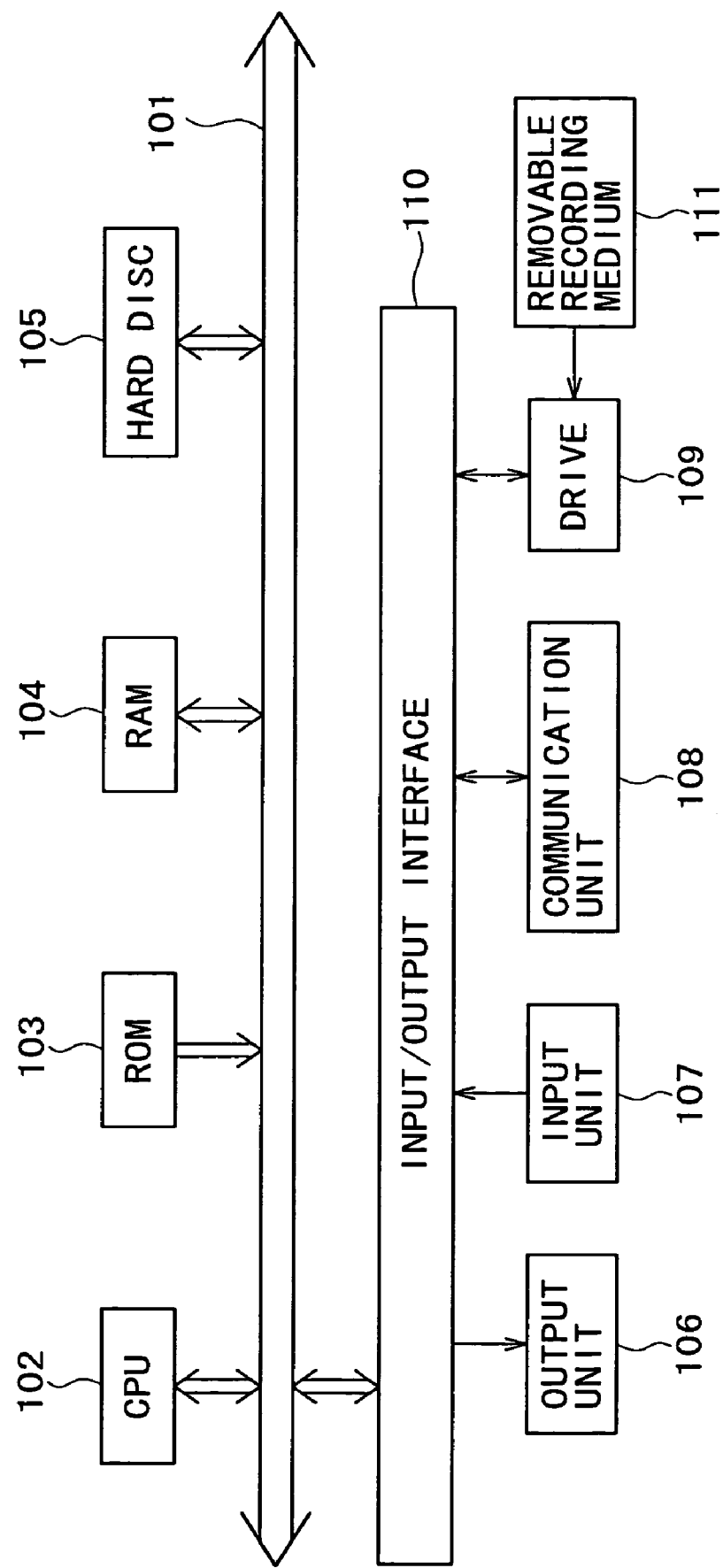

DATA-PROCESSING APPARATUS, DATA-PROCESSING METHOD AND PROGRAM

BACKGROUND OF THE INVENTION

The present invention relates to a data-processing apparatus, a data-processing method adopted in the data-processing apparatus and programs prescribing the data-processing method.

As the storage capacities of random-accessible disc recording mediums such as optical discs and HDs (Hard Discs) increase and the prices of such recording mediums decrease, non-destructive editing works can now be carried out on video and audio data recorded on an optical disc as data having a high-bit rate.

The non-destructive editing work is an editing process adopting an editing method for merely setting so-called edit points, namely, IN and OUT points, in AV data recorded on an optical disc as an edit material but not editing (or destructing) the edit material itself. In a non-destructive editing process, there is typically created a list of edit points set at the edit time. The list of edit points is referred to hereafter as a play list. A result of a non-destructive editing process is then reproduced in accordance with a play list created for the edit material. That is to say, a result of a non-destructive editing process carried out on an edit material recorded on an optical disc is reproduced by reproducing the edit material in accordance with edit points described on a play list created for the edit material. If an editing work other than the non-destructive editing processing needs to be carried out on an edit material completing an irreversible process such as an MPEG encoding process, the edit material must be first decoded, results of the decoding process are then connected to each other and the decoding results connected to each other are finally subjected to an MPEG encoding process. By carrying out the non-destructive editing processing, however, such decoding and encoding processes do not have to be repeated so that the picture quality can be prevented from deteriorating due to repeated decoding and encoding processes.

It is to be noted that, if an edit material is connected to another edit material in a non-destructive editing process, a special effect may be attached to the junction between the edit materials in some cases. If a special effect is attached as such in a non-destructive editing process, in an operation to reproduce the result of the editing process, it is necessary to read out the two edit materials on both sides of the junction with an attached special effect from an optical disc and to attach another special process to the junction. For this reason, in accordance with Japanese Patent Laid-open No. Hei 11-146330 and a U.S. application identified by a Ser. No. of 09/185,021 as a U.S. application associated with Japanese Patent Laid-open No. Hei 11-146330, only the junction to which another special effect is to be attached is recorded in advance.

By the way, a clip is defined as a collection of edit-material data between an edit point (that is, an IN point) and the next edit point (that is, an OUT point). Thus, a result of a non-destructive editing work can be reproduced in clip units. Different clips may be recorded in recording areas separated from each other on an optical disc.

Thus, a reproduction process based on a play list may transit from a specific clip to a next one. In this case, in a disc apparatus for reproducing these clips recorded on an optical disc, it is necessary to carry out a seek operation from a recording area for recording the specific chip to a recording area for recording the next clip.

If it takes much time to complete such a seek operation, the reproduction process may be unavoidably interrupted.

SUMMARY OF THE INVENTION

It is thus an object of the present invention addressing the problem described above to assure the real-time characteristic of reproduction processes.

In order to achieve the object described above, in accordance with an aspect of the present invention, there is provided a data-processing apparatus including: a real-time reproduction determination element for determining whether or not data recorded in a first recording area can be reproduced in a real-time manner; a data selection element, which is used for selecting data portions of the data recorded in the first recording area in case the data recorded in the first recording area cannot be reproduced in a real-time manner; and a relocation element for relocating the data portion selected by the data selection means to a second recording area.

In accordance with another aspect of the present invention, there is provided a data-processing method including: a real-time reproduction determination step of determining whether or not data recorded in a first recording area can be reproduced in a real-time manner; a data selection step, which is executed for selecting a data portion of the data recorded in the first recording area in case the data recorded in the first recording area cannot be reproduced in a real-time manner; and a relocation step of relocating the data portion selected at the data selection step to a second recording area.

In accordance with a further aspect of the present invention, there is provided a program to be executed by a computer for implementing a data-processing method including: a real-time reproduction determination step of determining whether or not data recorded in a first recording area can be reproduced in a real-time manner; a data selection step, which is executed for selecting a data portion of the data recorded in the first recording area in case the data recorded in the first recording area cannot be reproduced in a real-time manner; and a relocation step of relocating the data portion selected at the data selection step to a second recording area.

BRIEF DESCRIPTION OF THE DRAWINGS

FIG. 3 is a diagram showing a play list;

FIG. 4 is a diagram showing a list of application descriptors;

FIG. 20 is a flowchart referred to in explaining details of processing carried out at a step S5 of the flowchart shown in FIG. 19;

FIGS. 21A and 21B are flowcharts referred to in explaining details of processing carried out at a step S8 of the flowchart shown in FIG. 19;

FIG. 22 is a block diagram showing a typical configuration of another embodiment implementing a disc apparatus to which the present invention is applied; and FIG. 23 is a block diagram showing a typical configuration of an embodiment implementing a computer to which the present invention is applied.

DETAILED DESCRIPTION OF THE PREFERRED EMBODIMENTS

Figure 1:
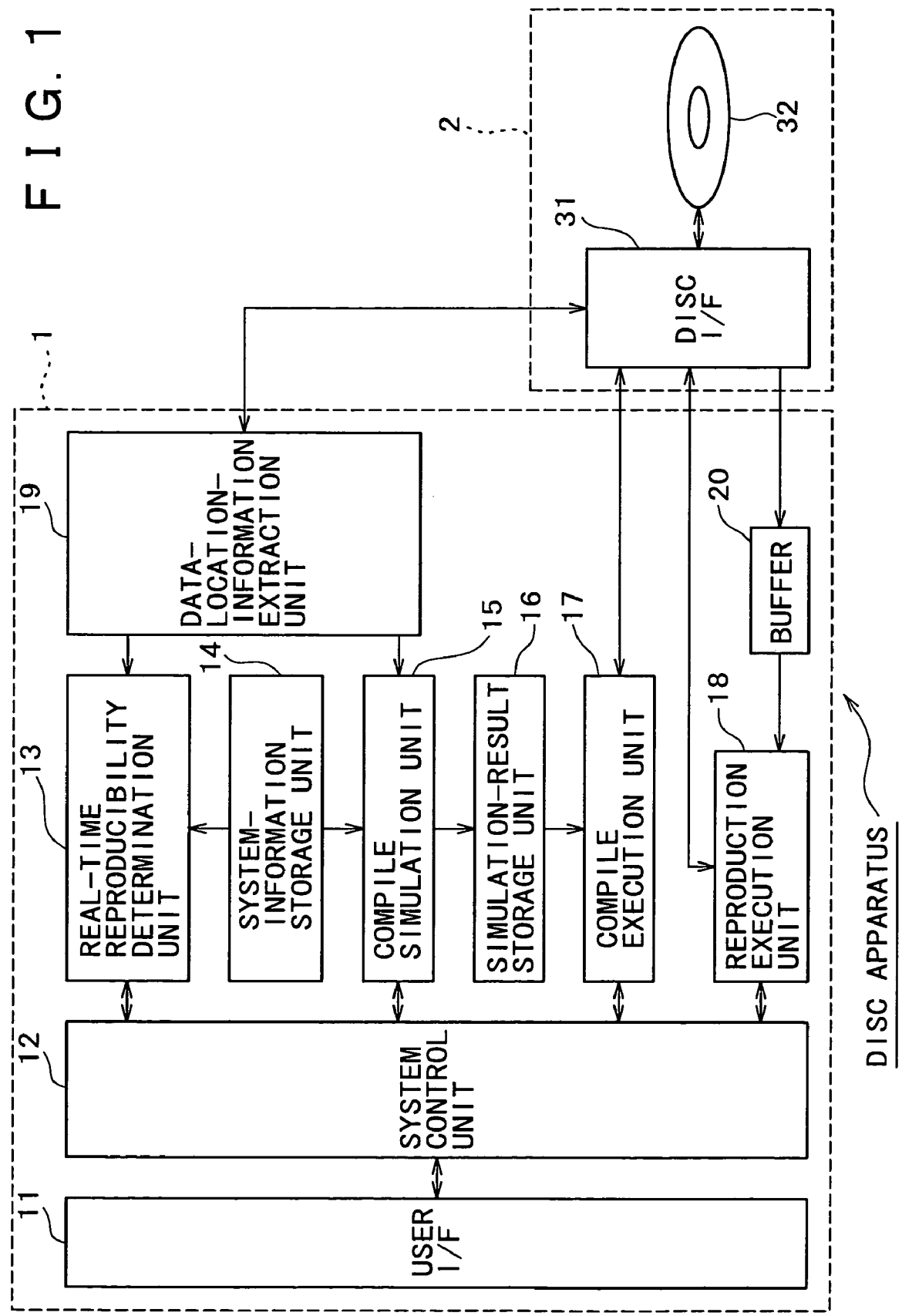
FIG. 1 is a block diagram showing a typical configuration of an embodiment implementing a disc apparatus to which the present invention is applied.

FIG. 1 is a block diagram showing a typical configuration of an embodiment implementing a disc apparatus to which the present invention is applied.

In the embodiment shown in FIG. 1, the disc apparatus includes a reproduction control unit 1 and a disc drive 2.

The reproduction control unit 1 includes a user I/F 11, a system control unit 12, a real-time reproducibility determination unit 13, a system-information storage unit 14, a compile simulation unit 15, a simulation-result storage unit 16, a compile execution unit 17, a reproduction execution unit 18, a data-location-information extraction unit 19 and a buffer 20. The reproduction control unit 1 controls operations to reproduce data from the disc drive 2.

The user I/F 11 includes an operation unit, a microphone, a display unit for displaying pictures and a speaker for outputting sounds. The operation unit includes a keyboard, switches and buttons. The user operates the user I/F 11, which supplies a signal representing the operation carried out by the user to the system control unit 12. On the other hand, the user I/F 11 displays a reproduced picture and outputs a reproduced sound. The picture and the sound are received from the system control unit 12 as results of a process to read out data from an optical disc 32 to be described later.

It is to be noted that, the user is of course allowed to enter an operation command such as a command to reproduce data from the optical disc 32 by operating the user I/F 11. In addition, it is needless to say that the user is also allowed to enter information such as a condition for carrying out a compilation process to be described later via the user I/F 11. Furthermore, the user I/F 11 also outputs not only a sound and a picture, which are reproduced from the optical disc 32, but also information such as a message and a compilation time. An example of the output message is a message indicating whether or not a picture and a sound can be reproduced from the optical disc 32. The compilation time is time it takes to complete a compilation process.

The system control unit 12 controls the real-time reproducibility determination unit 13, the compile simulation unit 15, the compile execution unit 17 and the reproduction execution unit 18 typically in accordance with an operation signal received from the user I/F 11.

On the basis of data including information stored in the system-information storage unit 14 and information received from the data-location-information extraction unit 19, the real-time reproducibility determination unit 13 determines whether or not AV (Audio Visual) data can be reproduced from the optical disc 32 in a real-time manner. By the AV data, video and audio data recorded on the optical disc 32 is implied.

The system-information storage unit 14 is a memory for storing system information. The system information is information on performance of the disc apparatus and information on specifications of the disc apparatus. To put it concretely, the system information includes a read rate, a buffer size, a seek time function, an allowable reproduction delay time to be described later and a reproduction rate of AV data. The read rate is a speed at which AV data is read out from the optical disc 32 by the disc drive 2. The buffer size is the storage capacity of the buffer 20. The seek time function is a function expressing a seek time it takes to complete a seek operation carried out by the disc drive 2. It is to be noted that the user is allowed to enter an allowable buffer size and an allowable reproduction delay time by operating the user I/F 11.

By using data including information stored in the system-information storage unit 14 and information received from the data-location-information extraction unit 19, the compile simulation unit 15 carries out a simulation of a compilation process to relocate AV data recorded on the optical disc 32, and supplies simulation-result information to the simulation-result storage unit 16. The simulation-result information is information obtained as a result of the compilation process. The simulation-result storage unit 16 is a memory for storing the simulation-result information received from the compile simulation unit 15 on a temporary basis.

On the basis of the simulation-result information recorded in the simulation-result storage unit 16, the compile execution unit 17 controls a disc I/F 31 employed in the disc drive 2 to carry out a compilation process to relocate AV data recorded on the optical disc 32.

The reproduction execution unit 18 controls a disc I/F 31 employed in the disc drive 2 to reproduce AV data recorded on the optical disc 32.

That is to say, when the user operates the user I/F 11 to make a request that AV data recorded on the optical disc 32 be reproduced, an operation signal making the request is supplied to the system control unit 12. When receiving the operation signal making the request for reproduction of the AV data, the system control unit 12 controls the reproduction execution unit 18 to reproduce the AV data. Then, the reproduction execution unit 18 requests the disc I/F 31 to supply a play list, entering a state of waiting for the disc I/F 31 to supply the play list. As the play list is received from the disc I/F 31, the reproduction execution unit 18 requests the AV data to be reproduced in accordance with the play list. The disc I/F 31 then reads out the AV data requested by the reproduction execution unit 18 from the optical disc 32 and supplies the AV data to the buffer 20 to be stored in the buffer 20. Subsequently, the reproduction execution unit 18 reads out the AV data from the buffer 20 and carries out a necessary process such as a decoding process on the AV data. Then, the reproduction execution unit 18 supplies a result of the process to the system control unit 12, and the system control unit 12 supplies the result to the user I/F 11. Thereby, the user I/F 11 outputs the AV data as pictures and sounds.

The data-location-information extraction unit 19 requests the disc I/F 31 to supply a play list stored on the optical disc 32 and a space area list showing available recording areas on the optical disc 32, passing on the play list and the space area list to the real-time reproducibility determination unit 13 and the compile simulation unit 15. The buffer 20 is a memory for temporarily storing AV data read out from the optical disc 32.

The disc drive 2 includes the disc I/F 31 for writing and reading out data onto and from the optical disc 32 mounted on the disc drive 2. The optical disc 32 can be mounted on and dismounted from the disc drive 2 with ease. At a request received from the reproduction execution unit 18, the disc I/F 31 reads out AV data from the optical disc 32 and supplies the AV data to the buffer 20. In addition, at a request received from the compile execution unit 17, the disc I/F 31 relocates AV data recorded in a certain recording area on the optical disc 32 to another recording area. Furthermore, the disc I/F 31 manages space areas on the optical disc 32 by using a space-area list, which is supplied to the data-location-information extraction unit 19 at a request made by the data-location-information extraction unit 19. Moreover, the disc I/F 31 reads out a play list from the optical disc 32 and supplies the play list to the data-location-information extraction unit 19 at a request received from the data-location-information extraction unit 19.

The optical disc 32 is a recording medium for typically recording a file of AV data to be used as an edit material and recording a play list obtained as a result of a non-destructive editing work carried out on AV data.

It is to be noted that, while a play list is typically recorded on an optical disc 32, for example, a play list can also be given to the disc apparatus shown in FIG. 1 from an external source. In addition, if an optical disc 32 is inserted into a cartridge, a play list can also be recorded in typically a semiconductor memory provided in the cartridge.

Figure 2:
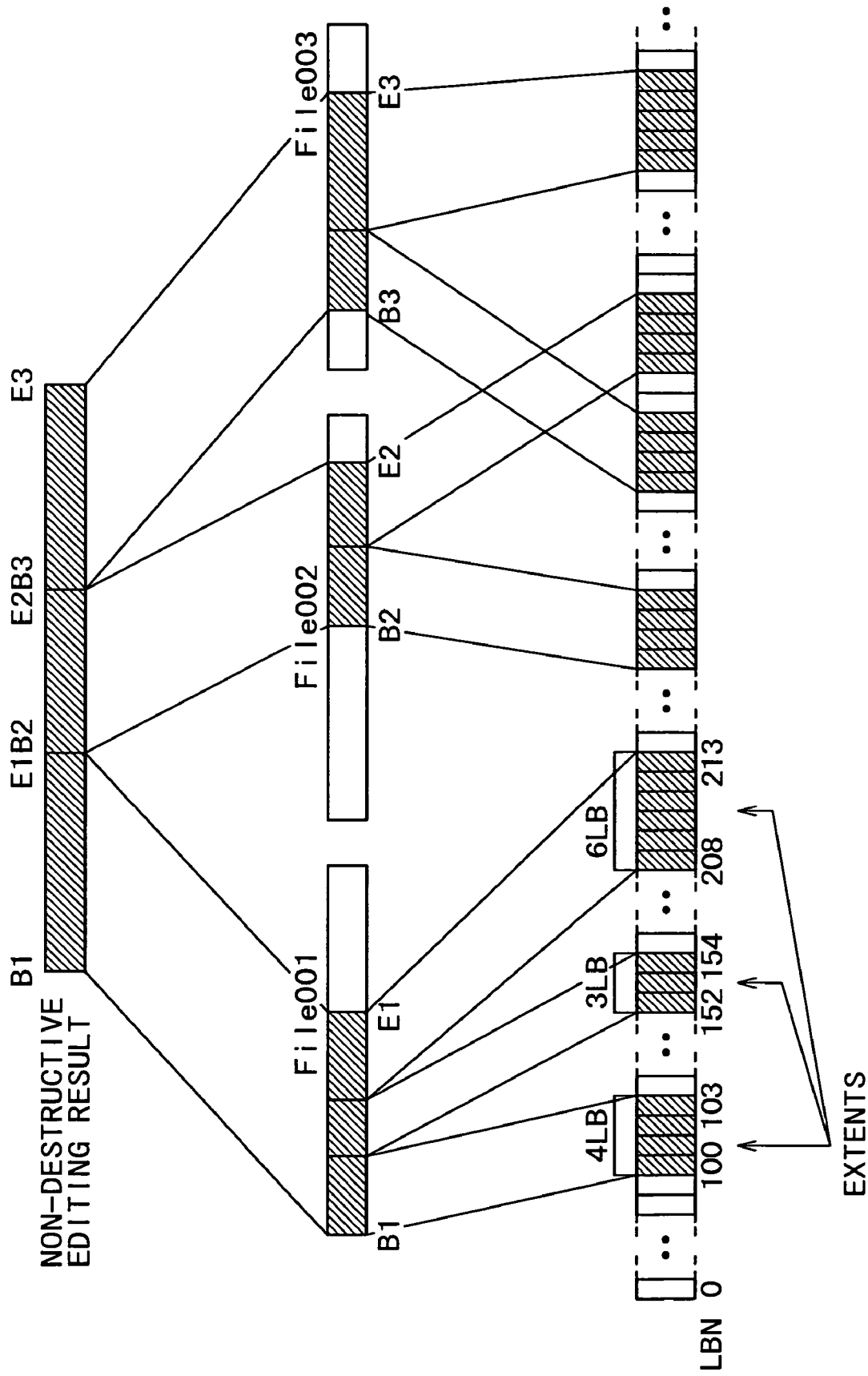
FIG. 2 is a diagram showing a relation between results of a non-destructive editing work and files of AV data recorded on an optical disc 32.

By referring to FIGS. 2 to 4, the following description explains a relation between a file of AV data to be used as an edit material recorded on an optical disc 32 and a play list as well as a relation between such a file and a result of a non-destructive editing work.

FIG. 2 is a diagram showing a relation between results of a non-destructive editing work and files of AV data recorded on the optical disc 32.

FIG. 2 shows files File001, File002 and File003, which are each recorded on an optical disc 32 as a file of AV data. An AV data sequence is a result of a non-destructive editing work, which connects AV data stored in file File001 as data from time code B1 to time code E1, AV data stored in file File002 as data from time code B2 to time code E2 and AV data stored in file File003 as data from time code B3 to time code E3 to each other in an order these pieces of AV data are enumerated here.

Typically, the recording area of an optical disc 32 is divided into contiguous LBs (logical blocks) each having a predetermined size. AV data is recorded in one or more logical blocks.

AV data of a single file stored on an optical disc 32 is not necessarily recorded in successive logical blocks. Instead, the AV data may be recorded in logical blocks separated away from each other as shown in FIG. 2. To put it in detail, the AV data stored in file File001 as data from time code B1 to time code E1 is subjected to a non-destructive editing work. The AV data stored in file File001 as data from time code B1 to time code E1 is recorded in logical blocks grouped into three contiguous segments separated from each other on the optical disc 32 as shown in FIG. 2. The first segment consists of four successive logical blocks identified by LBNs (logical block numbers) of 100 to 103. The second segment consists of three successive logical blocks identified by LBNs of 152 to 154. The third segment consists of six successive logical blocks identified by LBNs of 208 to 213. Each used for identifying a logical block, LBNs are ascending sequence numbers starting from 0. LBNs are assigned to logical blocks of the optical disc 32 in the order the logical blocks are read out from and written into the optical disc 32.

By the same token, the AV data stored in file File002 as data from time code B2 to time code E2 is recorded in logical blocks grouped into two contiguous segments separated from each other on the optical disc 32. In the same way, the AV data stored in file File003 as data from time code B3 to time code E3 is recorded in logical blocks divided into two contiguous segments separated from each other on the optical disc 32.

AV data of a single file is inadvertently segmented as described above due to typically operations carried out repeatedly to write and delete data into and from the optical disc 32.

FIG. 3 is a diagram showing a play list created for a result of the non-destructive editing work shown in FIG. 2.

The play list shows information indicating a sequence of AV data obtained as a result of the non-destructive editing work. The leftmost column of the play list shown in FIG. 3 shows sequence numbers indicating the sequence of the AV data. The second column from the left shows file names used as information for identifying files containing the AV data of the sequence. In addition, the third column from the left in the play list shown in FIG. 3 shows IN points, which are each a time code at the start of a sequence portion in a file associated with the IN point. Finally, the rightmost column of the play list shows OUT points, which are each a time code at the end of a sequence portion in a file associated with the OUT point.

By reproducing the AV data in accordance with the play list described above, the AV data can be reproduced, in a sequence obtained as a result of the non-destructive editing work shown in FIG. 2.

As a file system for managing files on the optical disc 32, in this case, a UDF (Universal Disk Format) is adopted for example. In accordance with the UDF, recording areas of the optical disc 32 are managed typically by using a list of allocation descriptors, which are each a structure.

That is to say, let a contiguous segment used as a contiguous recording area for recording continuous AV data in successive logical blocks on the optical disc 32 be referred to as an extent. An allocation descriptor describes an extent in the management of recording areas. To put it concretely, an allocation descriptor has structure members known as an extent length and an extent position. The extent length of an allocation descriptor is the length of an extent described by the allocation descriptor. On the other hand, the extent position of an allocation descriptor is the position of the beginning of an extent described by the allocation descriptor.

The extent length is typically expressed in terms of the number of logical blocks composing the extent. On the other hand, the extent position is typically expressed in terms of the LBN of a logical block at the beginning of the extent.

As described above by referring to FIG. 2, the AV data stored in file File001 as data from time code B1 to time code E1 is recorded in logical blocks grouped into three contiguous segments separated from each other as shown in FIG. 2. The first segment consists of four successive logical blocks identified by LBNs (logical block numbers) of 100 to 103. The second segment consists of three successive logical blocks identified by LBNs of 152 to 154. The third segment consists of six successive logical blocks identified by LBNs of 208 to 213. In this case, a list of allocation descriptors for the AV data stored in file File001 as data from time code B1 to time code E1 is shown in FIG. 4.

As is obvious from an allocation descriptor on the top row of the list shown in FIG. 4, a piece of AV data is recorded in four consecutive logical blocks starting with a logical block identified by a LBN of 100. An allocation descriptor on the second row from the top of the list shown in FIG. 4 indicates that another piece of AV data is recorded in three consecutive logical blocks starting with a logical block identified by a LBN of 152. As is obvious from an allocation descriptor on the third row from the top of the list shown in FIG. 4, a further piece of AV data is recorded in six consecutive logical blocks starting with a logical block identified by a LBN of 208.

As described above, if AV data obtained as a result of a non-destructive editing work is recorded in segments separated from each other on the optical disc 32, a seek operation occurs in the course of an operation to reproduce the AV data recorded in the separated segments. As explained earlier, if the time of the seek operation is long, an operation to read out the AV data from the optical disc 32 is not in time for the operation to reproduce the AV data in a real-time manner so that the reproduction operation is interrupted. To put it in detail, while the seek operation is being carried out in the disc apparatus shown in FIG. 1, the operation to read out the AV data from the optical disc 32 and store the AV data into the buffer 20 is suspended. Thus, the operation to reproduce the AV data in a real-time manner is interrupted unless the operation to read out the AV data from the optical disc 32 and store the AV data into the buffer 20 can be resumed before an underflow occurs in the buffer 20.

Thus, in order to prevent an underflow from occurring in the buffer 20, there is provided a pre-fetch method whereby, prior to an operation to reproduce the AV data obtained as a result of a non-destructive editing work, the AV data resulting from the non-destructive editing work as AV data to be reproduced right after the start of the reproduction operation is read out from the optical disc 32 and stored in the buffer 20 in advance so that AV data of a certain amount can be buffered in the buffer 20 beforehand.

In accordance with the pre-fetching method, however, AV data to be reproduced right after the start of the reproduction operation is read out from the optical disc 32 and stored in the buffer 20 in advance prior to an operation to reproduce the AV data. Thus, if a command to start the operation to reproduce the AV data is entered while an operation to store AV data in the buffer 20 is being carried out, a delay proportional to the amount of data to be stored in the buffer 20 is incurred. The delay is defined as a delay from an operation of entering a command for starting the processing to reproduce the AV data to a process of actually starting the operation to reproduce the AV data. Let a period of time allowed by the user for such a delay be referred to as an allowable reproduction delay time. If specifications of the disc apparatus and/or a request made by the user limits the allowable reproduction delay time, there is no enough time to store AV data of a sufficient amount in the buffer 20 so that it is impossible to assure the operation to reproduce the AV data in a real-time manner. In addition, even if no limit is imposed on the allowable reproduction delay time, AV data of a sufficient amount cannot be stored in the buffer 20 having an inadequate size so that it is impossible to assure the operation to reproduce the AV data in a real-time manner.

In addition, in accordance with the pre-fetching method, the buffer 20 has a size that is large enough for merely storing AV data read out from the optical disc 32 in advance prior to an operation to reproduce the AV data. Thus, if an underflow occurs in the buffer 20 after an overflow of the buffer 20 or after a state immediately preceding the overflow, due to the underflow, it becomes impossible to prevent the operation to reproduce the AV data from being interrupted. An overflow is defined as a state after AV data having an amount equal to the size of the buffer 20 has been stored in the buffer 20.

In order to solve the problems described above, the disc apparatus shown in FIG. 1 carries out a compilation process to relocate AV data already recorded on the optical disc 32 so as to assure an operation to reproduce the AV data in a real-time manner.

The following description explains the compilation process carried out by the disc apparatus shown in FIG. 1. Prior to the description, however, an overflow and an underflow that occur in the buffer 20 are explained.

Figure 5:
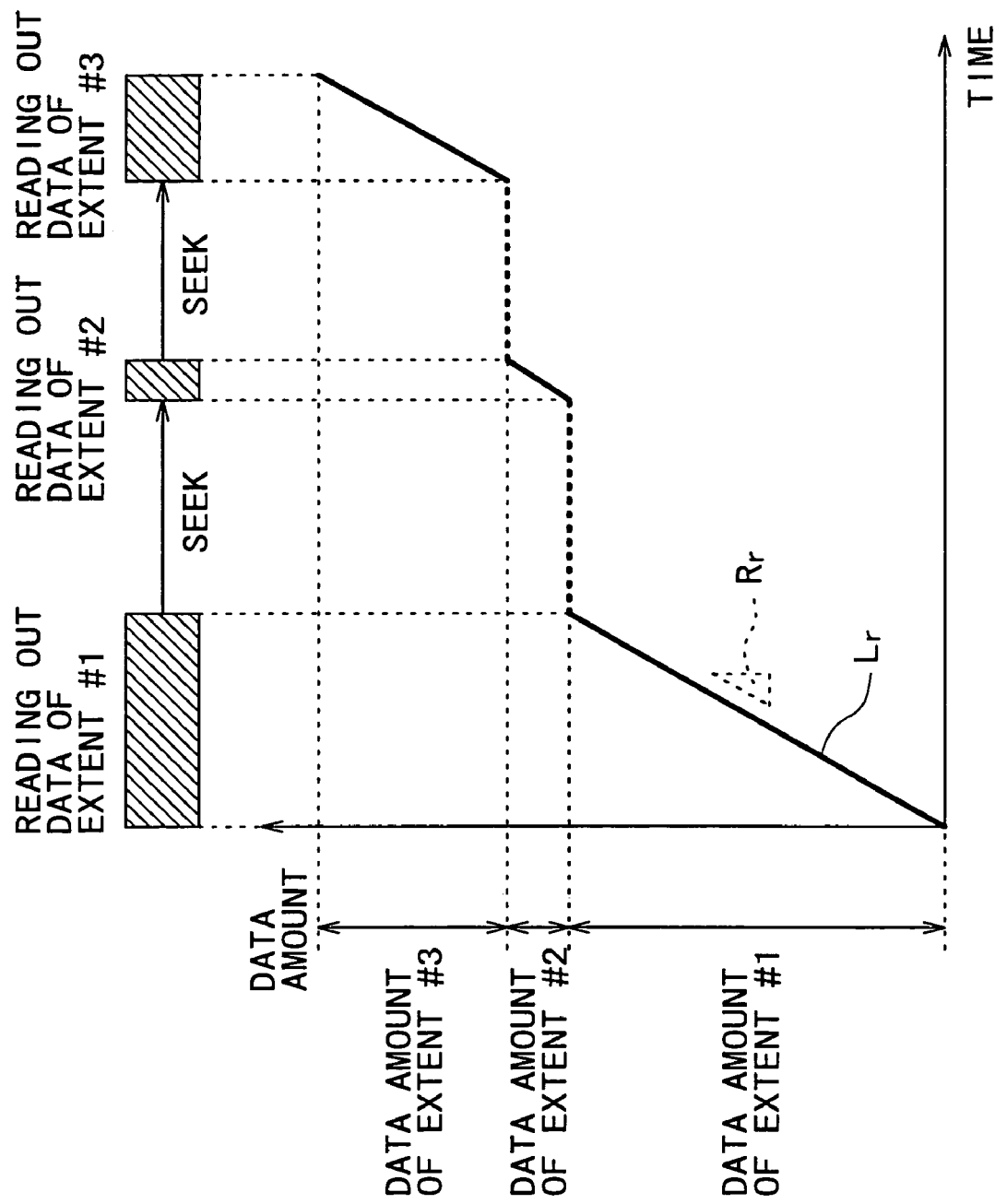
FIG. 5 is a diagram showing changes in cumulative amount of AV data read out from an optical disc 32, on which the AV data has been recorded in segments separated from each other.

FIG. 5 is diagram showing changes in cumulative amount of AV data read out from the optical disc 32, on which the AV data has been recorded in segments separated from each other, as changes with the lapse of time.

To put it concretely, the AV data read out from the optical disc 32 as shown in FIG. 5 has been recorded on the optical disc 32 in three extents separated from each other, i.e., extents #1, #2 and #3.

When AV data is actually read out from a specific extent of the optical disc 32, the cumulative amount of AV data read out from the specific extent changes as expressed by a straight line having a gradient equal to a read rate Rr, which is a speed at which the disc drive 2 reads out AV data from the optical disc 32. As the operation to actually read out the AV data from the specific extent is completed, on the other hand, an operation to actually read out the AV data from the next extent is started. Before the operation to actually read out the AV data from the next extent is started, however, the disc drive 2 carries out a seek operation from the specific extent to the next extent. While the seek operation is being carried out, AV data cannot be actually read out from an extent. Thus, the cumulative amount of AV data read out from the optical disc 32 does not change or is expressed by a straight line having a gradient of 0. As the seek operation is completed, the operation to actually read out the AV data from the next extent can be started. Thus, the cumulative amount of AV data read out from the next extent again changes as expressed by a straight line having a gradient equal to the read rate Rr.

In FIG. 5, a media read line Lr represents changes in cumulative amount of AV data read out from the optical disc 32 as changes with the lapse of time. The technical term 'media read line Lr' is used through out diagrams referred to in the following descriptions. It is to be noted that changes expressed by the media read line Lr as changes in cumulative amount of AV data read out from the optical disc 32 are also changes in cumulative amount of AV data stored in the buffer 20.

Figure 6:
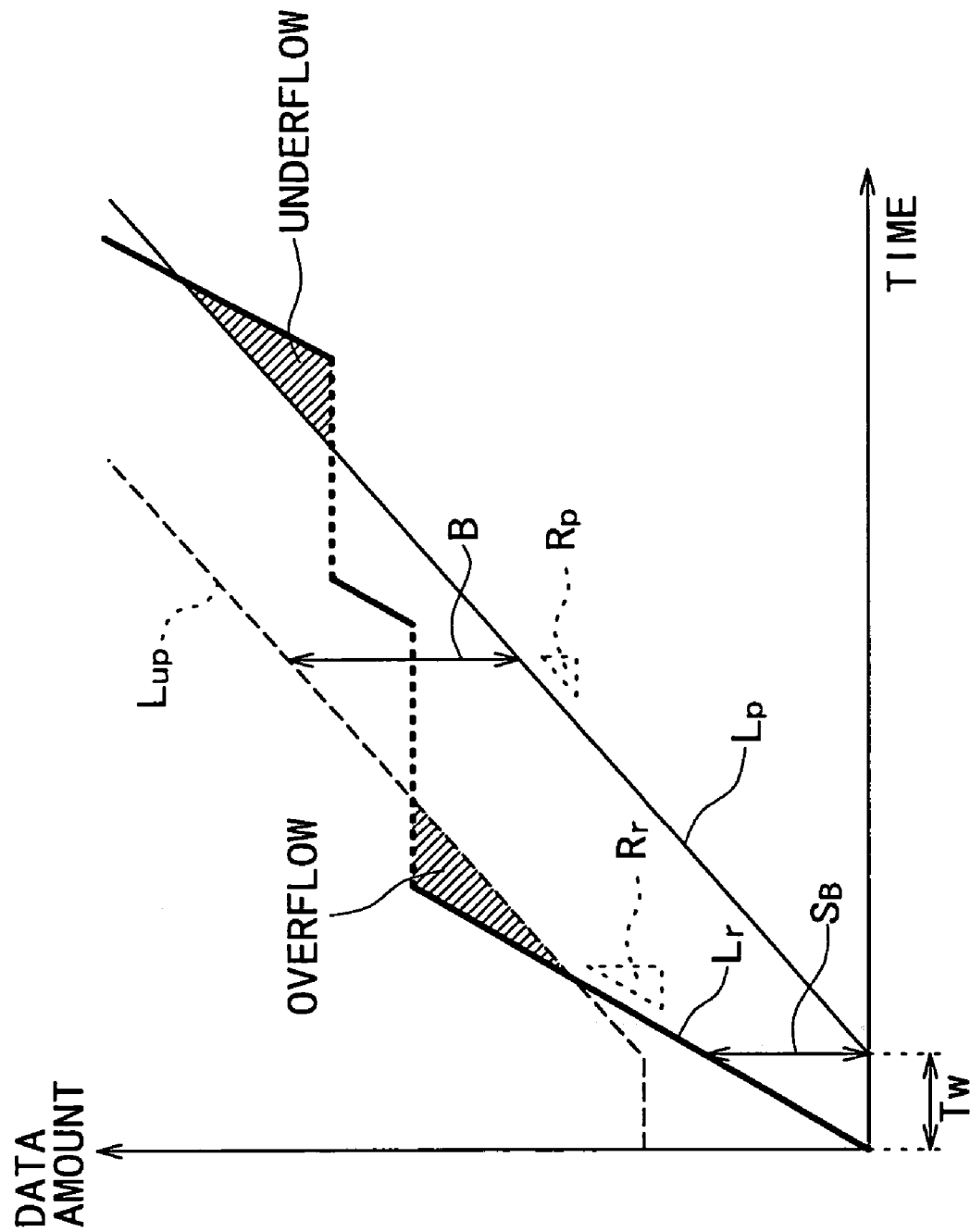
FIG. 6 is an explanatory diagram referred to in describing an overflow and an underflow.

By referring to FIG. 6, the following description explains an overflow and an underflow, which occur in the buffer 20.

Also in FIG. 6, a media read line Lr represents changes in cumulative amount of AV data read out from the optical disc 32 as described above by referring to FIG. 5. Also as described above, in the disc drive 2, the cumulative amount of AV data actually read out from the optical disc 32 changes as expressed by a straight line having a gradient equal to a read rate Rr. While the seek operation is being carried out, on the other hand, the cumulative amount does not change or is expressed by a straight line having a gradient of zero.

In FIG. 6, a real-time reproduction line Lp represents changes in minimum cumulative amount of AV data read out from the buffer 20 for insuring real-time reproduction of the AV data. Let symbol Tw denote an allowable reproduction delay time and symbol Rp denote the reproduction rate of the AV data. In this case, the real-time reproduction line Lp is a straight line that is originated from a start point on the x axis representing the time base and has a gradient equal to the reproduction rate Rp. The start point, from which the real-time reproduction line Lp is originated, has an x coordinate equal to the allowable reproduction delay time Tw.

The cumulative amount of AV data read out from the optical disc 32 represented by the media read line Lr at the allowable reproduction delay time Tw is the cumulative amount of AV data stored in the buffer 20 by execution of the pre-fetching method described above prior to the start of an operation to reproduce the AV data. In FIG. 6, the cumulative amount of AV data stored in the buffer 20 at the allowable reproduction delay time Tw is a pre-fetched buffer data amount denoted by symbol SB.

As described above, the real-time reproduction line Lp represents changes in minimum cumulative amount of AV data read out from the buffer 20 for insuring real-time reproduction of the AV data. Thus, if the real-time reproduction line Lp exceeds the media read line Lr representing changes in minimum cumulative amount of AV data read out from the optical disc 32 and stored in the buffer 20, an underflow occurs in the buffer 20.

The pre-fetched buffer data amount denoted by symbol SB is a cumulative amount of AV data read out from the optical disc 32 at the read rate Rr and stored in the buffer 20 during the allowable reproduction delay time Tw. Thus, the equation SB=Tw×Rr holds true. However, the size of the buffer 20 limits the pre-fetched buffer data amount SB. That is to say, the pre-fetched buffer data amount SB (=Tw×Rr) cannot exceed the size of the buffer 20.

As an operation to read out AV data from the buffer 20 is started, the amount of AV data stored in the buffer 20 decreases unless AV data is also read out from the optical disc 32 and newly stored in the buffer 20 at the same time. As described above, while a seek operation is being carried out, no AV data is read out from the optical disc 32 and newly stored in the buffer 20. Thus, if the time of the seek operation is long, no AV data is read out from the optical disc 32 and newly stored in the buffer 20 for a long time. In the meantime, all AV data stored in the buffer 20 may be read out exhaustively. A state in which all AV data stored in the buffer 20 has been read out exhaustively is referred to as an underflow of the buffer 20.

In FIG. 6, a buffer upper-limit line Lup represents changes in maximum cumulative amount of AV data that can be stored in the buffer 20 as changes with the lapse of time. Let symbol B denote the size of the buffer 20. In this case, the buffer upper-limit line Lup coincides with a straight line obtained by shifting the real-time reproduction line Lp in the upward direction by a distance equal to the buffer size B. Thus, the buffer upper-limit line Lup is a straight line having a gradient equal to the gradient of the reproduction rate Rp, as same as that of the real-time reproduction line Lp. So, the distance in the vertical direction between the lines Lup and Lp continuously indicates the buffer size B.

As described above, the buffer upper-limit line Lup represents changes in maximum cumulative amount of AV data that can be stored in the buffer 20. Thus, if the media read line Lr representing changes in cumulative amount of AV data read out from the optical disc 32 exceeds the buffer upper-limit line Lup, an overflow occurs in the buffer 20.

An overflow is explained in more detail as follows. In order to reproduce AV data from the optical disc 32 in a real-time manner, the operation to read out the AV data recorded on the optical disc 32 must be in time for the reproduction processing. Therefore, the read rate Rr must be greater than the reproduction rate Rp. If the read rate Rr is greater than the reproduction rate Rp, however, the media read line Lr having a gradient equal to the read rate Rr may exceed the buffer upper-limit line Lup having a gradient equal to the reproduction rate Rp. That is to say, the distance in the vertical direction between the media read line Lr and the real-time reproduction line Lp may exceed the buffer size B. When the distance in the vertical direction between the media read line Lr and the real-time reproduction line Lp exceeds the buffer size B, an overflow occurs in the buffer 20.

An underflow or overflow occurring in the buffer 20 is an obstruction to an operation to reproduce AV data in a real-time manner. It is thus necessary to get rid of an underflow and an overflow.

Figure 7:
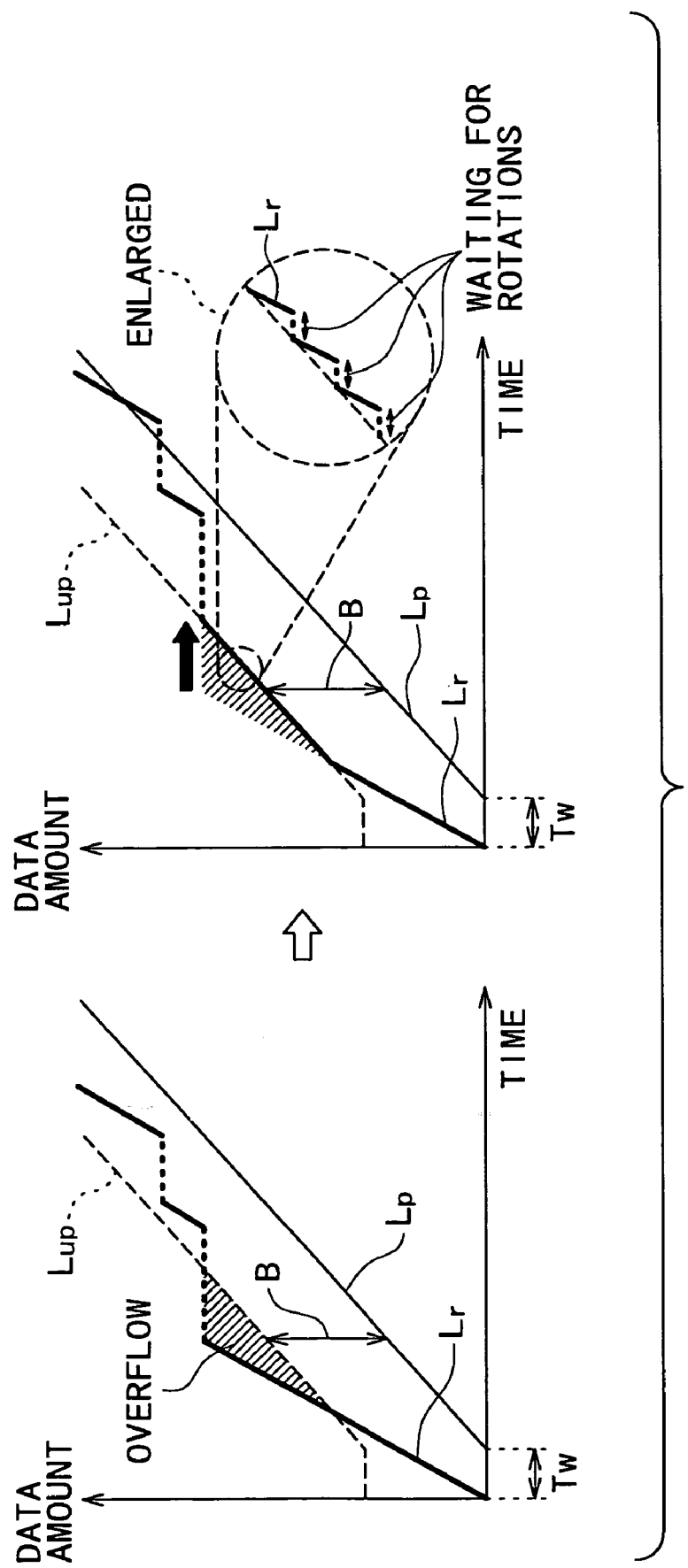
FIG. 7 is an explanatory diagram referred to in describing a method to get rid of an overflow.

First of all, by referring to FIG. 7, the following description explains a method to get rid of an overflow occurring in the buffer 20.

An overflow occurs in the buffer 20 when the cumulative amount of AV data read out from the optical disc 32 exceeds the upper-limit of the buffer. Thus, by suspending the operation to read out AV data from the optical disc 32, that is, by adopting the so-called rotation-waiting technique (a track jump) in the disc drive 2, whereby the operation can be delayed so that it is possible to get rid of an overflow.

That is to say, an overflow occurring in the buffer 20 is a state in which the media read line Lr exceeds the buffer upper-limit line Lup. It is thus possible to get rid of an overflow of the buffer 20 by delaying the operation to read out AV data from the optical disc 32 so as to prevent the media read line Lr from exceeding the buffer upper-limit line Lup as shown in FIG. 7.

It is to be noted that, in accordance with the technique shown in FIG. 7, at a point of time immediately preceding an overflow of the buffer 20, the disc drive 2 enters a rotation-waiting state to make the gradient of a portion of the media read line Lr equal to the reproduction rate Rp, which is the gradient of the buffer upper-limit line Lup. The point of time immediately preceding an overflow is a point of time at which the overflow is about to occur. In actuality, however, the gradient of the portion of the media read line Lr does not become equal to the reproduction rate Rp. Instead, by alternately repeating the change in cumulative amount at the reproduction rate Rr and the rotation-waiting state as shown in an enlarged circle in FIG. 7, the gradient of the portion of the media read line Lr becomes in essence, so to speak, equal to the reproduction rate Rp.

By the way, if an overflow is prevented from occurring in the buffer 20 by delaying the operation to read out AV data from the optical disc 32, as described above, the gradient of the portion of the media read line Lr becomes in essence equal to the reproduction rate Rp. Thus, a later portion of the media read line Lr is obtained by shifting the original media read line Lr in the right direction as shown in FIG. 7. The later portion of the media read line Lr is a part that follows the portion having a gradient in essence equal to the reproduction rate Rp, which is smaller than the read rate Rr.

If the media read line Lr is shifted in the right direction as described above, the shifted media read line Lr may go below the real-time reproduction line Lp, causing an underflow to occur in the buffer 20.

In accordance with the technique to get rid of an overflow by entering a rotation-waiting state as described above, the read rate Rr at which AV data is read out from the optical disc 32 is made virtually equal to the reproduction rate Rp in order to sustain the amount of AV data stored in the buffer 20 at a quantity corresponding to the buffer size B. Thus, it is possible to store AV data of an amount equal to an allowable maximum in the buffer 20.

It is therefore basically impossible to get rid of an underflow that occurs in the buffer 20 after AV data of an amount equal to an allowable maximum has been stored in the buffer 20.

That is to say, the fact that an underflow occurs in the buffer 20 after AV data of an amount equal to the allowable maximum has been stored in the buffer 20 indicates that a seek operation carried out to replenish AV data in the buffer 20 has such an excessively long seek time that, with only AV data stored in the buffer 20, the operation to reproduce the AV data in a real-time manner cannot be sustained. In order to sustain the operation to reproduce the AV data in a real-time manner without being interrupted by such an underflow, it is necessary to increase the size B of the buffer 20.

As is obvious from the above description, it is possible to determine whether or not AV data recorded on the optical disc 32 can be reproduced in a real-time manner by determining whether or not an underflow will occur in the buffer 20 or, in particular, by determining whether or not an underflow will occur after an overflow has been avoided in case the overflow occurs in the buffer 20. In the following description, the determination of whether or not an underflow will occur in the buffer 20 is also referred to simply as determination of real-time reproducibility.

It is possible to diagrammatically determine whether or not an underflow will occur in the buffer 20 from the media read line Lr, the real-time reproduction line Lp and the buffer upper-limit line Lup.

Figure 8:
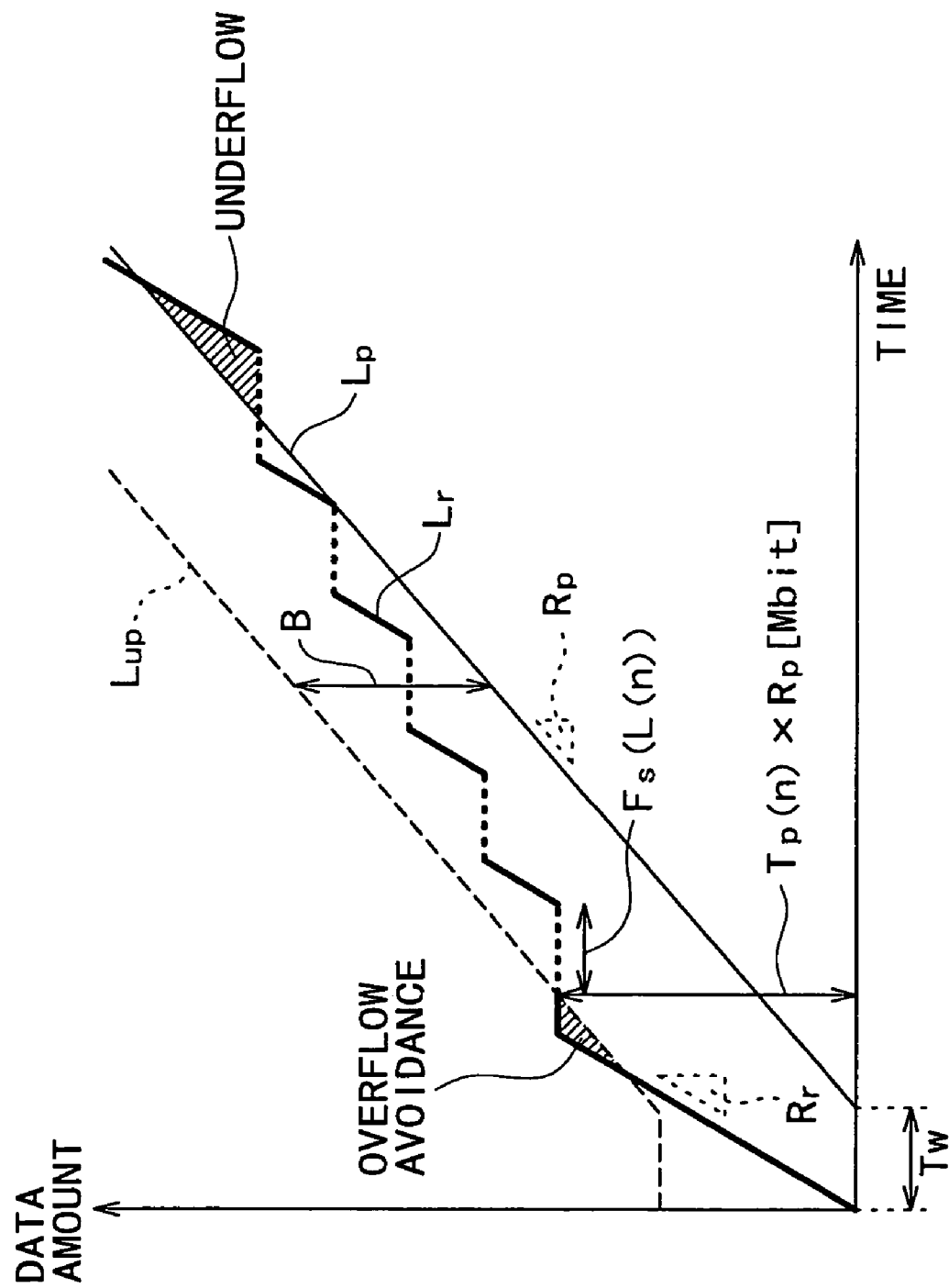
FIG. 8 is an explanatory diagram referred to in describing a method of determining whether or not AV data can be reproduced in a real-time manner.

As shown in FIG. 8, it is possible to draw a media read line Lr, a real-time reproduction line Lp and a buffer upper-limit line Lup from reproduction times Tp (n), distances L (n), a reproduction rate Rp, an allowable reproduction delay time Tw, a buffer size B, a read rate Rr and seek times Fs (Ln (n)). A reproduction time Tp (n) expressed in terms of seconds is time it takes to reproduce continuous AV data from extent #n. A distance L (n) expressed in terms of logical blocks is a distance between extent #n and next extent #(n+1) immediately following extent #n. The reproduction rate Rp is expressed in terms of Mbps (Mega bits per second). The allowable reproduction delay time Tw is expressed in terms of seconds. The buffer size B is expressed in terms of bits. The read rate Rr expressed in terms of Mbps. A seek time Fs (Ln (n)) expressed in terms of seconds is time it takes to carry out a seek operation along a distance L (n).

As shown in FIG. 8, it is possible to find a media read line Lr (or a media read line Lr following a point at which an overflow is avoided in case the overflow occurs in the buffer 20) from data amounts Tp (n)×Rp, the read rate Rr, the seek times Fs (L 8n)) and the buffer upper-limit Lup. A data amount Tp (n)×Rp is an amount of data stored in extent #n. A data amount Tp (n)×Rp is a product of a reproduction time Tp (n) and the reproduction rate Rp. As described earlier, a reproduction time Tp (n) is time it takes to reproduce continuous AV data from extent #n. Also as described before, a seek time Fs (Ln (n)) is time it takes to carry out a seek operation along a distance L (n) between extent #n and next extent #(n+1) immediately following extent #n. A real-time reproduction line Lp can be found from the reproduction rate Rp and the allowable reproduction delay time Tw. A buffer upper-limit line Lp can be found from the buffer size B and the real-time reproduction line Lp, which can be found from the allowable reproduction delay time Tw and the reproduction rate Rp as described above.

It is to be noted that, from a play list, it is possible to obtain the reproduction time Tp (n), which is time it takes to reproduce continuous AV data from extent #n, and the distance L (n) between extent #n and next extent #(n+1) immediately following extent #n. The allowable reproduction delay time Tw, the reproduction rate Rp and the buffer size B are prescribed in required specifications of the disc apparatus or data determined in accordance with a request made by the user. The read rate Rr and the seek time Fs (Ln (n)) are data determined by the performance of the disc apparatus.

A function Fs ( ) expressing the seek time Fs (Ln (n)), which is time it takes to carry out a seek operation along a distance L (n), is referred to as a seek time function provided as a piece of system information described above.

In the disc apparatus shown in FIG. 1, the data-location-information extraction unit 19 acquires a play list. The reproduction rate Rp, the allowable reproduction delay time Tw, the buffer size B, the read rate Rr and the seek time function Fs ( ) are stored in the system-information storage unit 14 in advance as system information.

The real-time reproducibility determination unit 13 employed in the disc apparatus shown in FIG. 1 finds a media read line Lr, a real-time reproduction line Lp and a buffer upper-limit line Lup from the reproduction time Tp (n) of each extent #n, each distance L (n) between extent #n and next extent #(n+1) immediately following extent #n, the reproduction rate Rp, the allowable reproduction delay time Tw, the buffer size B, the read rate Rr and each seek time Fs (Ln (n)). Then, on the basis of the media read line Lr, the real-time reproduction line Lp and the buffer upper-limit line Lup, the real-time reproducibility determination unit 13 determines whether AV data can be reproduced in a real-time manner.

If the disc apparatus shown in FIG. 1 gets a determination result indicating that AV data cannot be reproduced in a real-time manner as a result of determination of real-time reproducibility, that is, if an underflow would occur in the buffer 20 should AV data be reproduced, the disc apparatus carries out a compilation process of relocating AV data recorded on the optical disc 32 so as to assure the real-time characteristic of the reproduction processing.

Figure 9:
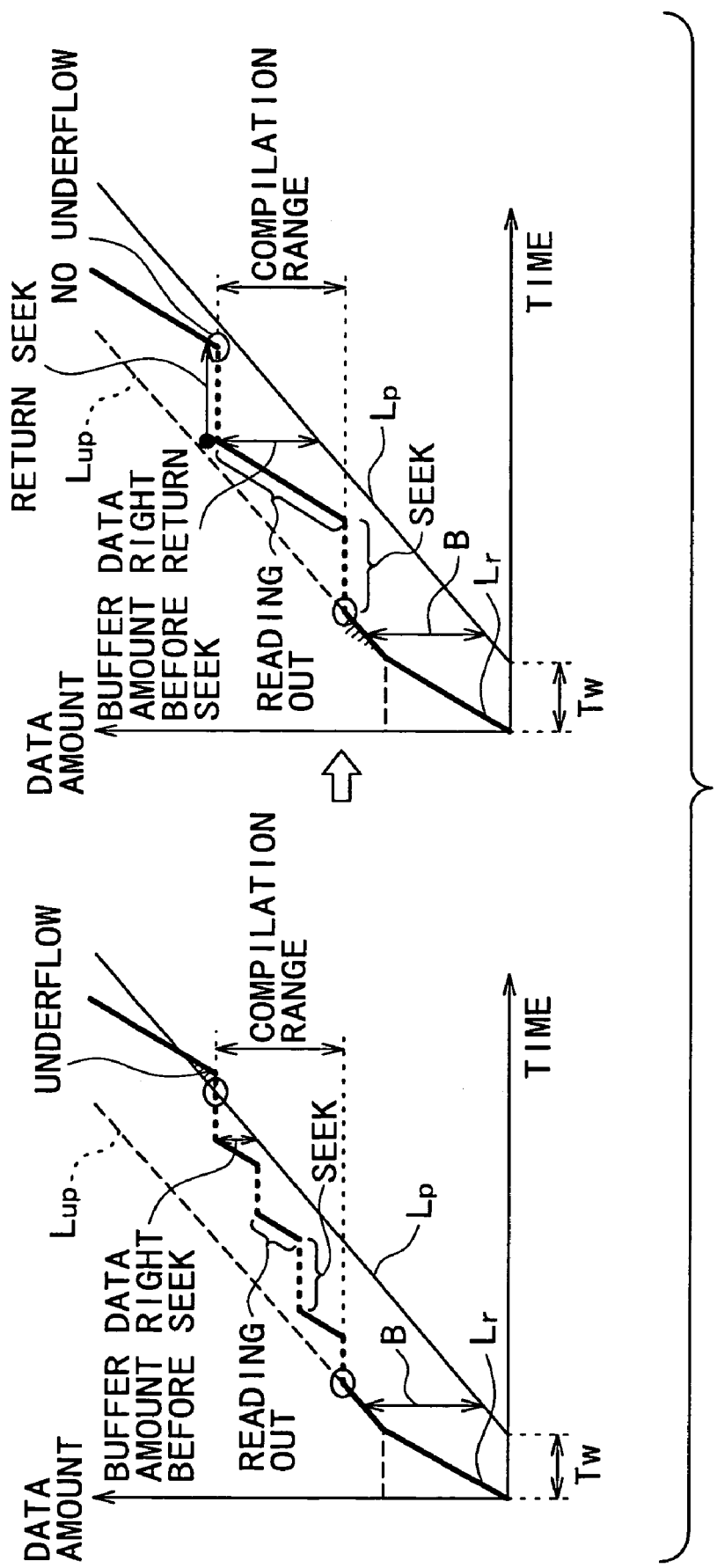
FIG. 9 is an explanatory diagram referred to in describing a compilation process carried out to assure an operation to reproduce AV data in a real-time manner.

As shown in FIG. 9, an underflow is caused by a long seek time of a seek operation carried out in a transition from extent #n to next extent #(n+1) immediately following extent #n in the course of a process to read out AV data from the optical disc 32 or caused by frequent seek operations. Thus, if no seek operation is carried out in a transition from extent #n to next extent #(n+1) immediately following extent #n in the course of a process to read out AV data from the optical disc 32, that is, should extent #n and extent #(n+1) be located successively in a contiguous recording area, it is possible to get rid of the underflow.

Thus, it is necessary to carry out a compilation process of relocating AV data recorded on the optical disc 32 in the disc drive 2 shown in FIG. 1 so as to consecutively arrange a plurality of extents composing the AV data in their reproduction order in a single contiguous recording area.

Assume that a plurality of extents has been subjected to a compilation process to result in a single extent. In this case, after an operation to read out AV data from the single extent obtained as a result of the compilation process is completed, it is necessary to read out AV data from the next extent immediately following the single extent. In a transition of the read operation from the single extent to the next extent, a seek operation is carried but. This seek operation is referred to as a return seek operation. It is thus necessary to carry out a compilation process of relocating extents in order to store AV data of an amount large enough for sustaining an operation to reproduce AV data in a real-time manner during the seek time of the return seek operation in the buffer 20 immediately before the return seek operation as shown in FIG. 9.

While an underflow can be prevented from occurring in the buffer 20 by carrying out a compilation process, it is desirable to shorten a compilation time as much as possible. The compilation time is time it takes to perform a compilation process. It is also desirable to select as small a relocation area on the optical disc 32 as possible for the sake of efficient utilization of recording areas. The relocation area is a recording area in which extents subjected to the compilation process are to be relocated.

Figure 10:
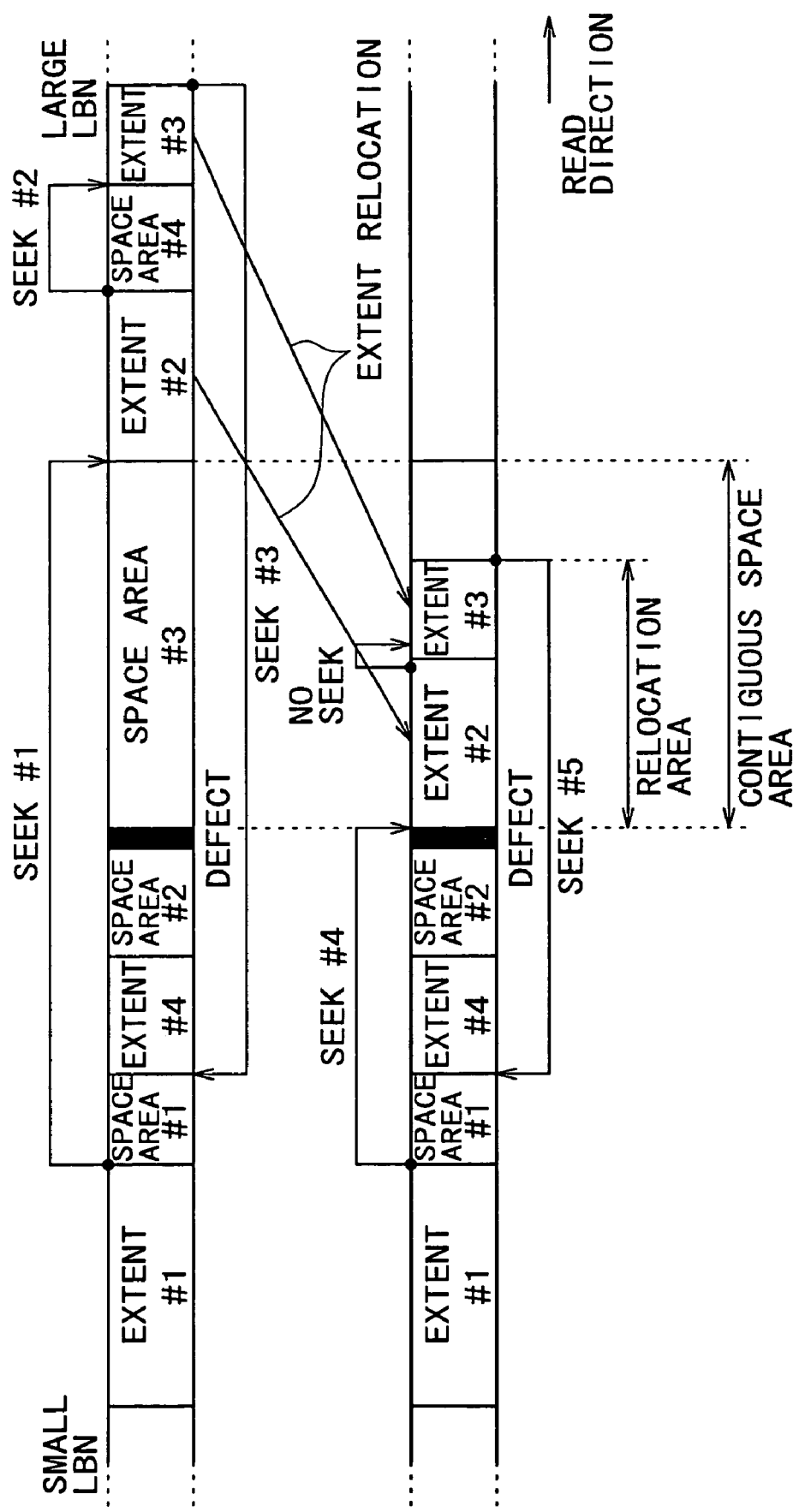
FIG. 10 is a diagram showing a compilation process to relocate extents on an optical disc 32 to a relocation area.

FIG. 10 is a diagram showing a compilation process to relocate extents on the optical disc 32. It is to be noted that, in FIG. 10, the left-to-right direction is the direction of an order in which operations to read out and write AV data from and into the optical disc 32 are carried out.

In FIG. 10, extent numbers #1, #2, #3 and #4 are sequence numbers indicating a read/write order of four extents #1, #2, #3 and #4. However, the four extents have been recorded on the optical disc 32 in the following order: #1, #4, #2 and #3. In addition, space recording area #1 exists between extents #1 and #4. Furthermore, space recording area #2, a defective area and space recording area #3 exist between extents #4 and #2. Moreover, space recording area #4 exists between extents #2 and #3. It is to be noted that the order in which the four extents are to be reproduced are also #1, #2, #3 and #4.

As shown in FIG. 10, the space recording area on the optical disc 32 is inadvertently segmented typically as a result of repeated operations to write and erase AV data onto and from the optical disc 32 or due to existence of a defective area on the optical disc 32.

Now, assume for example that extents #2 and #3 are subjected to a compilation process and space area #3 is taken as the relocation area, which is a recording area in which extents #2 and #3 are to be relocated as described above. In this case, a result of the compilation process is shown in FIG. 10.

It is to be noted that, since a compilation process is carried out for the purpose of getting rid of a seek operation, it is necessary to relocate extents #2 and #3 to be reproduced consecutively in such a relocation area that a seek operation is not required in reading out AV data from the relocation area. That is to say, it is necessary to relocate extents #2 and #3 in such a relocation area that the extents can be read out from the relocation area continuously in the reproduction order. Thus, the relocation area must be a space recording area having a size large enough for accommodating extents #2 and #3. For this reason, one of space areas #1 to #4 available on the optical disc 32 as segments separated from each other as shown in FIG. 10 is selected as the relocation area having a size large enough for contiguously relocating extents #2 and #3. In this example, space area #3 is selected as the relocation area. In the compilation process, extents #2 and #3 are relocated as contiguous AV data in this relocation area.

Extents obtained as a result of a non-destructive editing work are typically AV data with its contents comprising video and audio data gathered up by the non-destructive editing work. Since the video and audio data has been gathered up in the non-destructive editing work, it is nice to relocate the extents as contiguous AV data in the relocation area by carrying out the compilation process.

Extents #1, #2, #3 and #4 shown in FIG. 10 are reproduced in an order indicated by their sequence numbers. In this case, without the compilation process, extent #1 is first read out. Then, a seek operation from extent #1 to extent #2 is carried out before extent #2 is read out. Subsequently, another seek operation from extent #2 to extent #3 is carried out before extent #3 is read out. Finally, a further seek operation from extent #3 to extent #4 is carried out before extent #4 is read out.

As described above, without the compilation process, it is necessary to carry out a total of three seek operations, i.e., seek operation #1 from extent #1 to extent #2, seek operation #2 from extent #2 to extent #3, and seek operation #3 from extent #3 to extent #4.

With the compilation process carried out, on the other hand, a seek operation to extent #2 is carried out after extent #1 has been read out. After the seek operation, extent #2 is read out. Then, extent #3 located contiguously after extension #2 is read out without carrying out a seek operation. Another seek operation to extent #4 is carried out after extent #3 has been read out. After the other seek operation, extent #4 is read out.

As described above, with the compilation process carried out, it is necessary to carry out only a total of two seek operations, i.e., seek operation #4 from extent #1 to extent #2 and seek operation #5 from extent #3 to extent #5. In addition, in the example shown in FIG. 10, a distance resulting from the compilation process as the length of seek operation #4 from extent #1 to extent #2 is smaller than the length of seek operation #1 from extent #1 to extent #2 prior to the compilation process. By the same token, the length of seek operation #5 from extent #3 to extent #4 is smaller than the length of seek operation #3 from extent #3 to extent #4. Thus, the seek times of the seek operations obtained as a result of the compilation process are also shorter than the seek times of the corresponding seek operations prior to the compilation process.

By carrying out the compilation process described above, the disc apparatus shown in FIG. 1 assures an operation to reproduce AV data in a real-time manner. Thus, seek operations to be carried out in consequence of completion of the compilation process must not become an obstruction to the operation to reproduce AV data in a real-time manner. That is to say, the compilation process must be completed with 2 conditions satisfied. One of the conditions requires that, in the course of a migration seek operation, no underflow shall occur in the buffer 20. The other condition requires that, in the course of a return seek operation, no underflow shall occur in the buffer 20. The migration seek operation is a seek operation from a compilation start point to the head of the relocation area. From the post-compilation point of view, the compilation start point is a start point at which the migration seek to the head of the relocation area is started. The return seek operation is a seek operation from a compilation end point to an extent to be reproduced after the last extent in the relocation area. The compilation end point is an end point at which an operation to read out the last extent from the relocation area is ended.

It is to be noted that, in the example shown in FIG. 10, seek operation #4 from extent #1 to extent #2 after the compilation process is the migration seek whereas seek operation #5 from extent #3 after the compilation process to extent #4 is the return seek.

Since a compilation process is carried out for the purpose of preventing an underflow from occurring in the buffer 20, the compilation start point must precede a point at which an underflow would otherwise occur in the buffer 20. It is to be noted that, from the pre-compilation point of view, the compilation start point is a start point at which the compilation process is to be started. If the compilation process is started prior to (avoidance of) an overflow that would otherwise occur right before the underflow in the buffer 20, however, the compilation process will offer no merit. This is because (the avoidance of) the overflow will cause AV data of an amount equal or close to the buffer size B to be stored in the buffer 20 anyway.

For the reason described above, as shown in FIG. 11, the compilation start point must be a point after completion of (avoidance of) an overflow that would otherwise occur right before the underflow occurring in the buffer 20 but, at the same time, must precede a point at which an underflow would otherwise occur in the buffer 20.

In addition, an underflow must not occur in the buffer 20 in the course of a migration seek operation as described above. Thus, the compilation start point must be a point at which as much AV data as required for sustaining an operation to reproduce AV data in a real-time manner during the seek time of the migration seek operation has been stored in the buffer 20.

Figure 11:
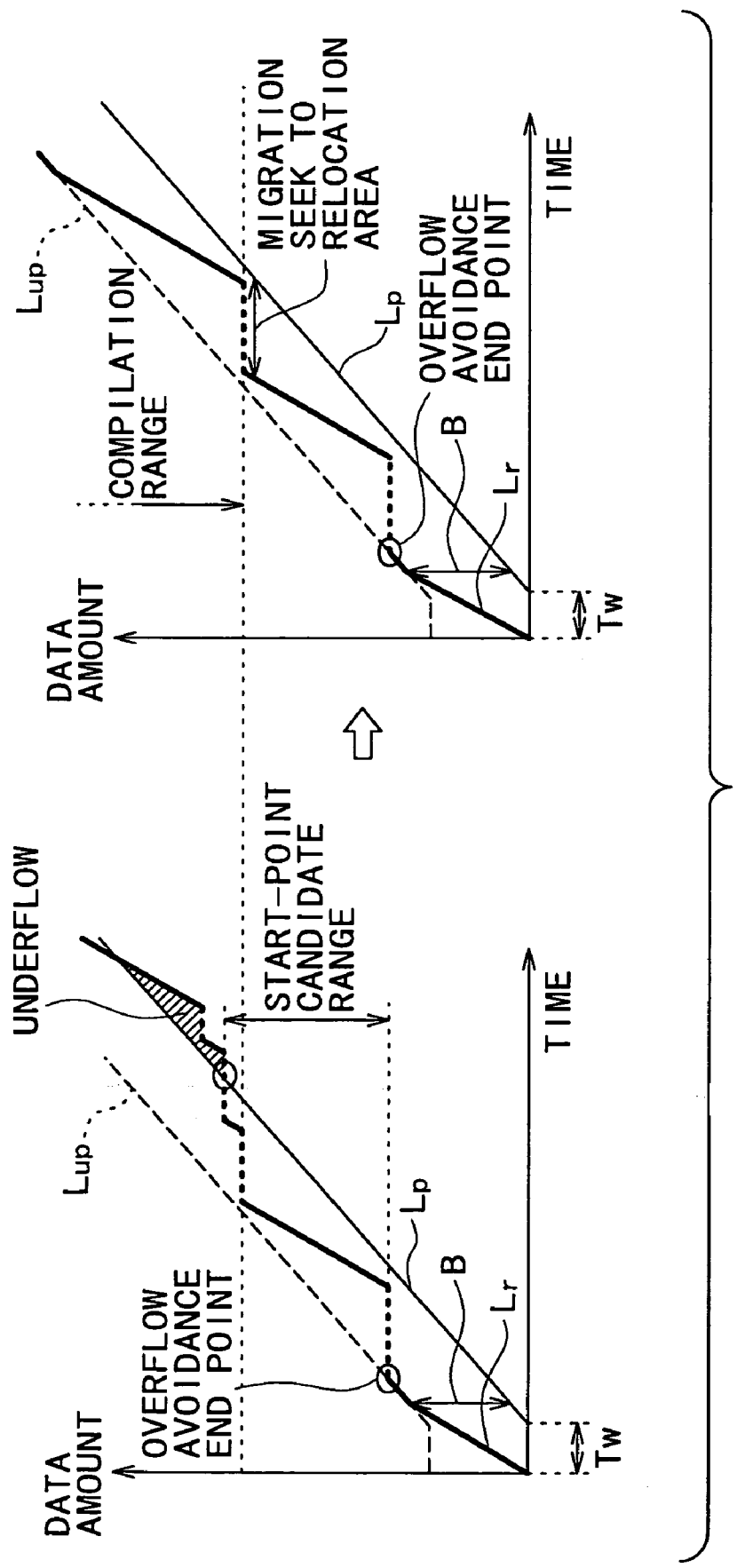
FIG. 11 is an explanatory diagram referred to in describing a method of determining a compilation start point.

Once a compilation start point is determined, a plurality of extents after the compilation start time is taken as an object of the compilation process as shown in FIG. 11.

Figure 12:
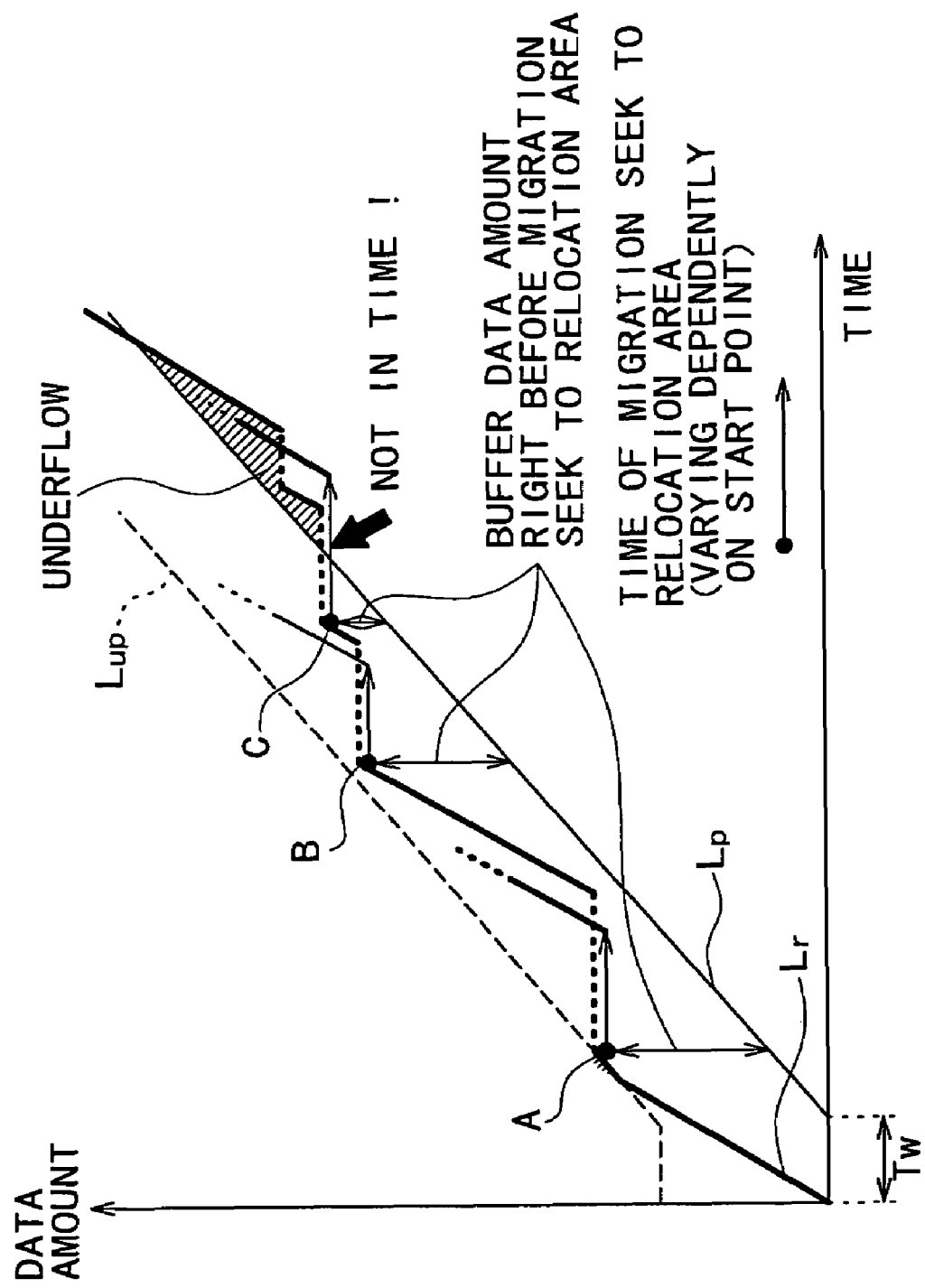
FIG. 12 is an explanatory diagram referred to in describing a method of determining a compilation start point.

Let points A, B and C on the media read line Lr shown in FIG. 12 be each taken as a candidate for the compilation start point. Candidates A, B and C are each a point that is located after completion of (avoidance of) an overflow that would otherwise occur right before the underflow in the buffer 20 but located before a point at which an underflow would otherwise occur in the buffer 20. A point in a range between a point of completion of (avoidance of) such an overflow and a point of occurrence of the underflow is referred to as a so-called left shoulder. In order to shorten the compilation time, it is necessary to relocate as few extents serving as an object of compilation as possible in order to transfer as little AV data included in the segments as possible. From this compilation-time-reduction point of view, point B after point A immediately following the completion of (the avoidance of) the overflow is a compilation start point more desirable than point A and, by the same token, point C after point B but before the underflow is a compilation start point more desirable than point B.

In order to transfer least possible AV data included in fewest possible extents serving as an object of compilation, it is desirable to take a point succeeding the point of completion of (avoidance of) the overflow by a longest possible distance or a point preceding the point of occurrence of the underflow by a shortest possible distance as the compilation start point as described above. A point succeeding the point of completion of (avoidance of) the overflow or preceding the point of occurrence of the underflow is a point with a reproduction time lagging behind the point of completion of (avoidance of) the overflow or leading ahead of the point of occurrence of the underflow. If the compilation start point is too close to the point of occurrence of the underflow, however, the amount of AV data stored in the buffer 20 immediately before the migration seek operation is not large enough for sustaining an operation to reproduce AV data in a real-time manner during the seek time of the migration seek operation. As a result, an underflow caused by the migration seek operation will occur in the buffer 20.

As the compilation start point, it is thus desirable to take a point, which leads ahead of the point of completion of (avoidance of) the overflow by a longest possible distance but yet assures that the amount of AV data stored in the buffer 20 immediately before the migration seek operation is large enough for sustaining an operation to reproduce the AV data in a real-time manner during the seek time of the migration seek operation. In the example shown in FIG. 12, point B is the compilation start time most desirable among points A, B and C.

It is to be noted that the seek time of a migration seek operation is basically dependent on the distance between the relocation area and a start point, at which the migration seek operation is started.

Figure 13:
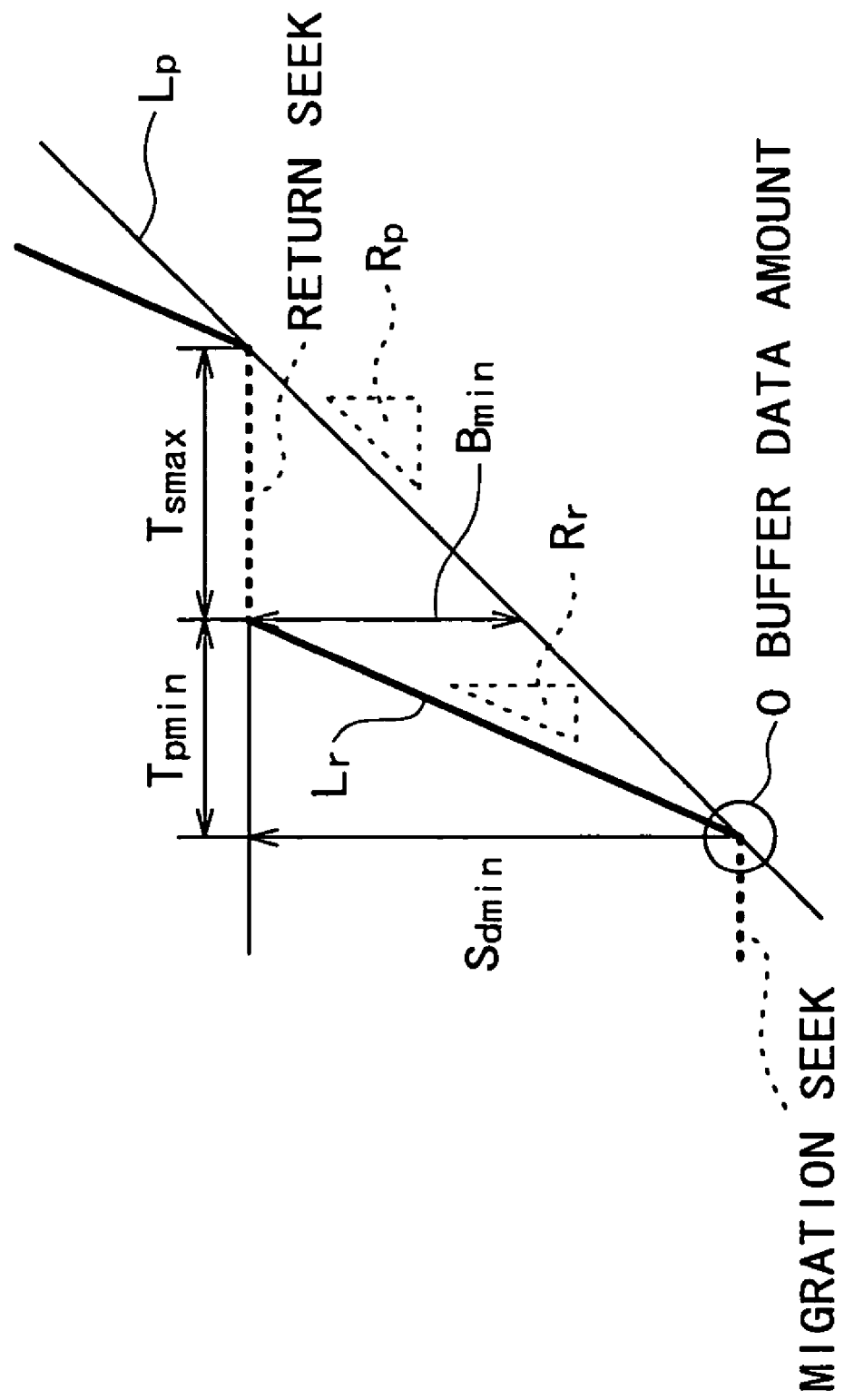
FIG. 13 is an explanatory diagram referred to in describing the size of a relocation area to which extents are relocated in a compilation process.
Figure 14:
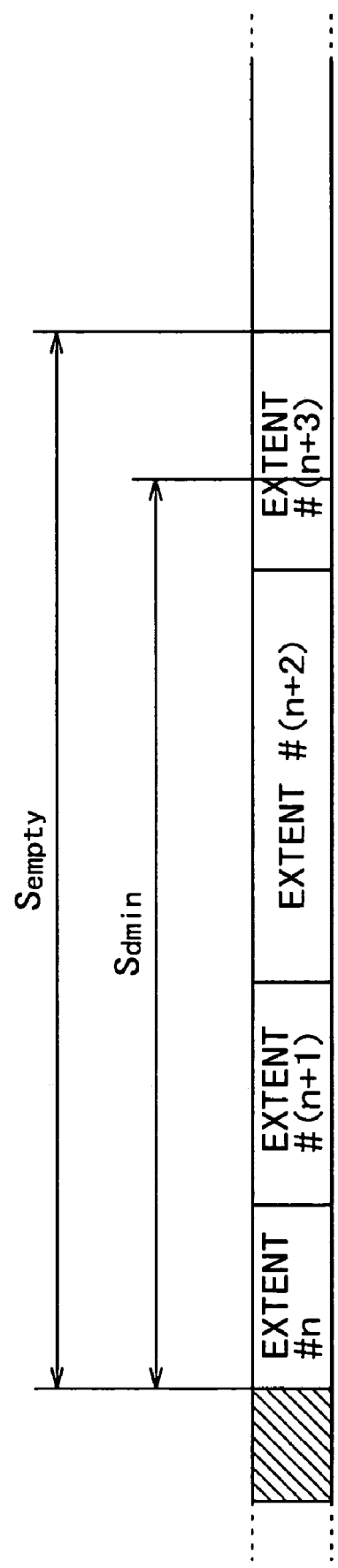
FIG. 14 is an explanatory diagram referred to in describing the size of a relocation area to which extents are relocated in a compilation process.

By referring to FIGS. 13 and 14, the following description explains a relocation area in which extents are to be relocated in a compilation process.

After an operation to read out extents relocated in a relocation area during a compilation process is ended, a return seek operation to an extent to be reproduced after the extents relocated in a relocation area is carried out. It is thus necessary to select such a size of the relocation area that the amount of AV data read out from the relocation area and stored in the buffer 20 is large enough for sustaining an operation to reproduce the AV data in a real-time manner during the seek time of the return seek operation. The size of the relocation area must be at least equal to the total size of extents relocated in the relocation area.

Let symbol Tsmax denote the maximum seek time of the return seek and symbol Bmin denote a minimum assurance buffer data amount. The minimum assurance buffer data amount Bmin is defined as the amount of AV data that must be stored in the buffer 20 as AV data sufficient for at least sustaining an operation to reproduce the AV data in a real-time manner without interruption caused by an underflow during the maximum seek time Tsmax of the return seek operation. The minimum assurance buffer data amount Bmin is expressed in terms of the maximum seek time Tsmax by the following equation:

$$Bmin = Tsmax \times Rp \quad (1)$$

where symbol Rp denotes a reproduction rate at which the operation to reproduce AV data in a real-time manner is carried out.

It is to be noted that the maximum seek time Tsmax can be regarded as time it takes to carry out a seek operation as follows. Assume that the location of AV data recorded on the optical disc 32 is limited to a specific recording area represented by LBNs in a certain range extending from a minimum LBN to a maximum LBN. In this case, the maximum seek time Tsmax is time it takes to carry out a seek operation from a logical block included in the specific recording range as a logical block identified by the minimum LBN to a logical block included in the specific recording range as a logical block identified by the maximum LBN. However, the location of AV data recorded on the optical disc 32 may not be specially limited to a specific recording area. That is to say, it is quite within the bounds of possibility that AV data can be located in any recording area. In this case, the maximum seek time Tsmax is time it takes to carry out the so-called full stroke seek operation.

By the way, there is a case in which the amount of AV data that must be stored in the buffer 20 in an operation to read out extents relocated in a relocation area in a compilation process reaches a maximum. The amount of such AV data reaches a maximum if the amount of AV data is 0 at completion of a migration seek operation to the relocation area and the return seek operation is a seek operation with a seek time equal to the maximum seek time Tsmax as shown in FIG. 13. The amount of such AV data is referred to as a minimum continuous-data assurance time Sdmin. Let a minimum assurance reproduction time Tpmin be defined as a reproduction time of AV data reproduced while AV data of an amount equal to the minimum continuous-data assurance time Sdmin is being read out. In this case, the minimum assurance buffer data amount Bmin, the minimum assurance reproduction time Tpmin, the read rate Rr and the reproduction rate Rp satisfy the following equation:

$$B\mathrm{min} = T p\mathrm{min} \times (Rr - Rp)$$

Thus, the minimum assurance reproduction time Tpmin can be expressed by the following equation:

$$T p\mathrm{min} = B\mathrm{min}/(Rr - Rp) \quad (2)$$

In addition, the minimum continuous-data assurance time Sdmin, the minimum assurance reproduction time Tpmin and the read rate Rr satisfy the following equation:

$$S d\mathrm{min} = T p\mathrm{min} \times Rr \quad (3)$$

Substituting the expression on the right-hand side of Eq. (1) to Eq. (2) for the minimum assurance buffer data amount Bmin to get a new expression of the minimum assurance reproduction time Tpmin and substituting the new expression to Eq. (3) for the minimum assurance reproduction time Tpmin yield an equation expressing the minimum continuous-data assurance time Sdmin in terms of the maximum seek time Tsmax, the reproduction rate Rp and the read rate Rr as follows:

$$S d\mathrm{min} = T s\mathrm{max} \times Rr \times Rp / (Rr - Rp) \quad (4)$$

In order to prevent an underflow from occurring in the course of a return seek operation, it is necessary to set the size of the relocation area at a value at least equal to the minimum continuous-data assurance time Sdmin expressed by Eq. (4) for a worst case, which is a case in which the amount of data stored in the buffer 20 after the migration seek operation is 0 and the seek time of the return seek operation is equal to the maximum seek time Tsmax.

As described above, in order to prevent an underflow from occurring in the course of a return seek operation, it is necessary to set the size of the relocation area at a value at least equal to the minimum continuous-data assurance time Sdmin. It is to be noted, however, that extents relocated in the relocation area are read out as a single extent and, as shown in FIG. 14, the total amount of data of the extents to be relocated to the relocation area does not match the minimum continuous-data assurance time Sdmin in many cases. In order to solve this problem, let symbol Sempty denote a minimum assured size required for the relocation area. The minimum assured size Sempty is defined as a total size of a maximum number of extents that can be accommodated in the minimum continuous-data assurance time Sdmin and the extent to be reproduced immediately after the accommodated extents. The accommodated extents start with an extent at the compilation start time. Assume that extents are to be relocated to a relocation area having a size equal to the minimum assured size Sempty. That is to say, in the compilation process, a recording area having a size equal to the minimum assured size Sempty is selected as the relocation area among contiguous space areas each having a size at least equal to the minimum assured size Sempty. Then, the extents are relocated to the relocation area.

By referring to FIGS. 15 to 18, the following description explains a method of determining a compilation end point defined as an end point at which a compilation process is ended.

Figure 15:
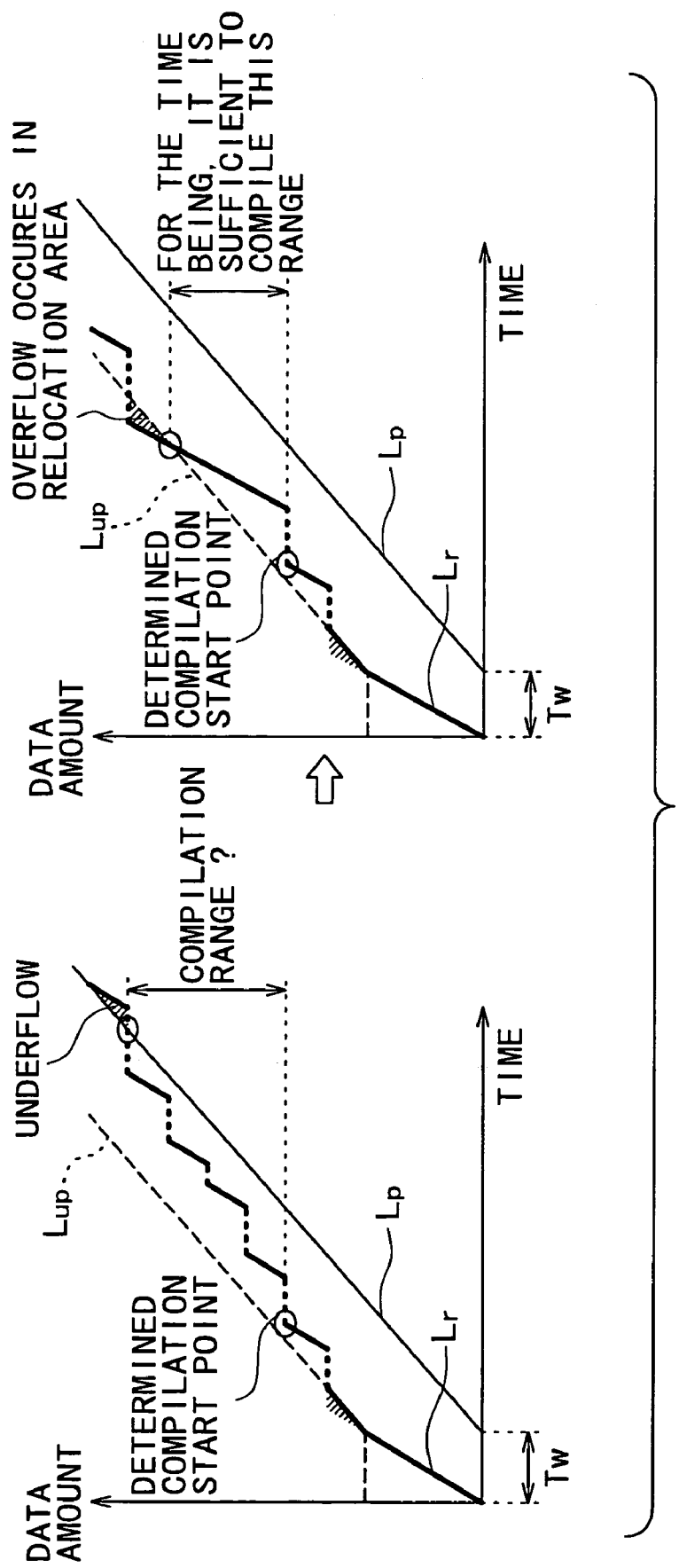
FIG. 15 is an explanatory diagram referred to in describing a method of determining a compilation end point.

As shown in FIG. 15, by carrying out a compilation process started at a compilation start point, the number of seek operations can be reduced so as to get rid of an underflow that will otherwise occur if the compilation process is not carried out.

By the way, in a compilation process, extents are relocated as continuous AV data to a relocation area. Thus, if the number of extents relocated in the compilation process is large, the amount of AV data read out from the relocation area and stored in the buffer 20 in a read operation increases gradually, causing an overflow to occur in the buffer 20 eventually as shown in FIG. 15. However, it is possible to get rid of an overflow by entering a state of waiting for rotations of the optical disc 32 as described above. In a compilation process, extents are relocated to a relocation area allocated to the compilation process for the purpose of preventing an underflow from occurring in the buffer 20, that is, for filling up the buffer 20 with AV data of an amount capable of assuring continuous reproduction of AV data during the seek time of a seek operation. Thus, if the buffer 20 is filled up in the compilation process with AV data of only an amount incapable of preventing an underflow from occurring in the buffer 20, the compilation process is meaningless.

For the reason described above, it is sufficient to carry out a compilation process and continue the process to a point at which an overflow is about to occur in the buffer 20. That is to say, it is not always necessary to carry out a compilation process to a point at which an underflow will otherwise occur if the compilation process is not performed.

Figure 16:
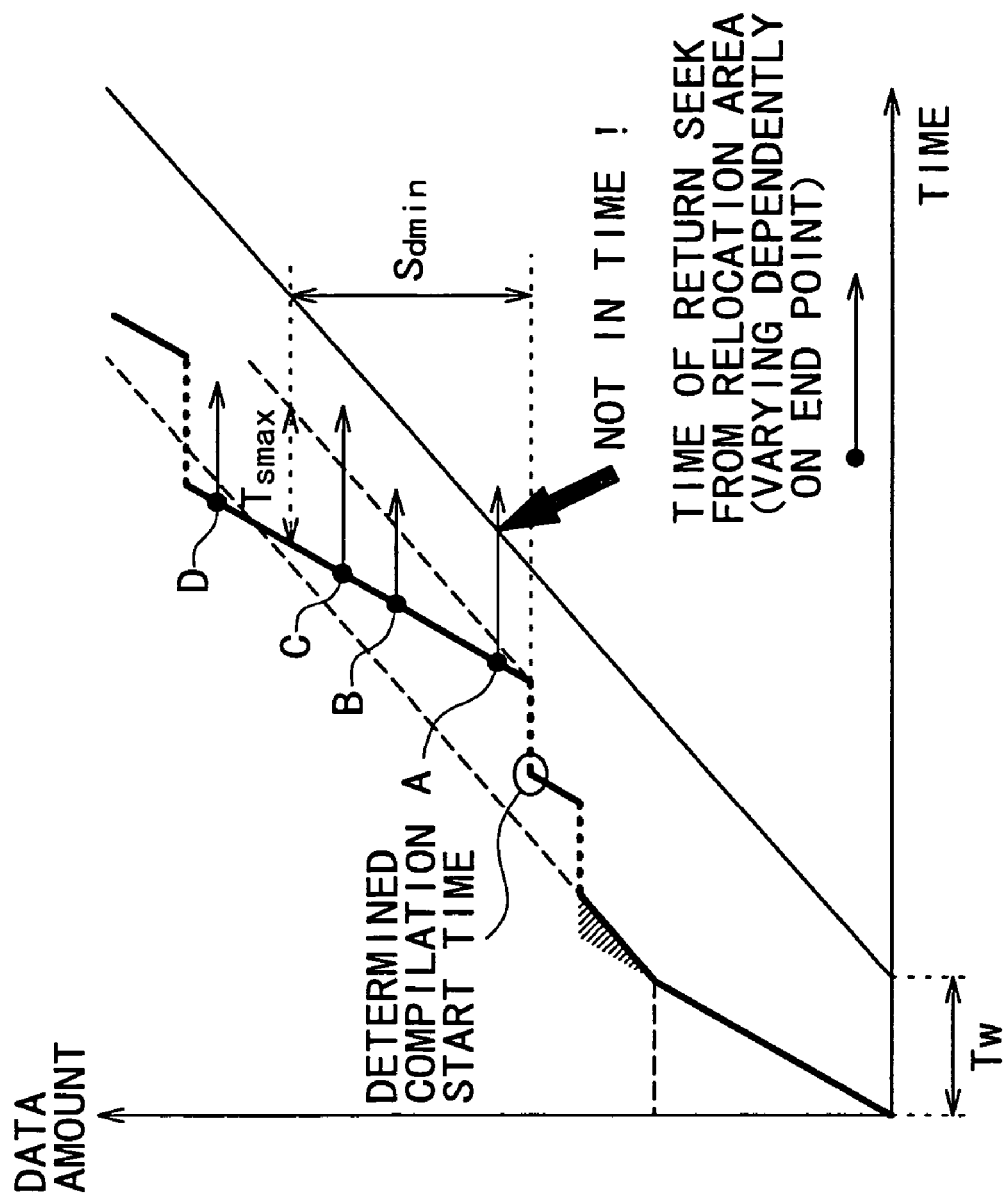
FIG. 16 is an explanatory diagram referred to in describing a method of determining a compilation end point.

With regard to as to where the compilation process is to be ended, as candidates for the compilation end point, take points A, B, C and D between the compilation start point and an overflow that would occur in the buffer 20 should all extents relocated into the relocation area by the compilation process be read out and stored in the buffer 20 as shown in FIG. 16. It is to be noted that points A, B, C and D are located at positions in an order of moving away from the compilation start point.

In the example shown in FIG. 16, if point A closest to the compilation start point is taken as the compilation end point, the amount of AV data stored in the buffer 20 as a result of an operation to read out extents from the relocation area is not large enough for sustaining an operation to reproduce AV data in a real-time manner during the seek time of the return seek operation. That is to say, the reproduction of AV data will be interrupted by an underflow occurring in the buffer 20 in the course of the return seek operation.

In the example shown in FIG. 16, if point B after point A closest to the compilation start point, point C following point B or point D farthest from the compilation start point is taken as the compilation end point, the amount of AV data stored in the buffer 20 as a result of an operation to read out extents from the relocation area is large enough for sustaining an operation to reproduce AV data in a real-time manner during the seek time of the return seek operation. That is to say, the reproduction of AV data will not be interrupted by an underflow occurring in the buffer 20 in the course of the return seek operation. Much like the migration seek operation explained earlier by referring to FIG. 12, the seek time of a return seek operation varies in dependence on a point (or a position) at which the return seek operation is started.

As is obvious from the above description, any one of points B, C and D can be taken as the compilation end point, for which points A to D each serve as a candidate.

By the way, a minimum condition for the compilation end time requires that the amount of AV data stored in the buffer 20 as a result of an operation to read out extents from the relocation area shall be large enough for sustaining an operation to reproduce AV data in a real-time manner during the seek time of the return seek operation. From this minimum-condition point of view, any one of points B, C and D can be taken as the compilation end point.

In order to shorten the time it takes to carry out a compilation process as much as possible, however, it is desirable to reduce the total size of extents to be subjected to the compilation process as much as possible too. At the same time, however, space areas on the optical disc 32 must be utilized effectively as well as efficiently. From this effective/efficient-utilization point of view, it is necessary to relocate extents with a total size as large as possible to a contiguous recording space area selected as the relocation area. That is to say, it is desirable to determine such extents to be subjected to a compilation process that the extents have a total size, which is as close to the size of the contiguous recording space area as possible.

The method to determine a compilation end point by reducing the total size of extents to be subjected to the compilation process as much as possible is referred to as a first method. On the other hand, a second method is the aforementioned method to determine a compilation end point by determining such extents to be subjected to a compilation process that the extents have a total size, which is as close as possible to the size of the contiguous recording space area selected as the relocation area.

In accordance with the first method, point B closest to the compilation start point among points B to D shown in FIG. 16 is determined to be the compilation end point. In accordance with the second method, on the other hand, point D farthest from the compilation start point among points B to D shown in FIG. 16 is determined to be the compilation end point.

It is to be noted that, in the example shown in FIG. 16, point D is a point at which an overflow would occur in the buffer 20. As described earlier, an attempt to continue the compilation process after this overflow point is meaningless. In order to cope with this problem, in the actual implementation of the second method, in case an overflow is expected to occur, a point of time at which the overflow would otherwise occur in the buffer 20 is taken as the compilation end time even if the total size of extents subjected to a compilation process has not approached the size of the contiguous recording area used as the relocation area, as opposed to the true second method trying to take the total size of the extents to a value as close to the size of the relocation area as possible.

Assume that a compilation end point has been determined by adoption of the first or second method. Even in this case, a compilation process can be ended at a point preceding the compilation end point provided that, at the preceding point, the compilation process has completed the relocation of as many extents as required to prevent reproduction of AV data during the seek time of a return seek operation from being interrupted by an underflow.

Figure 17:
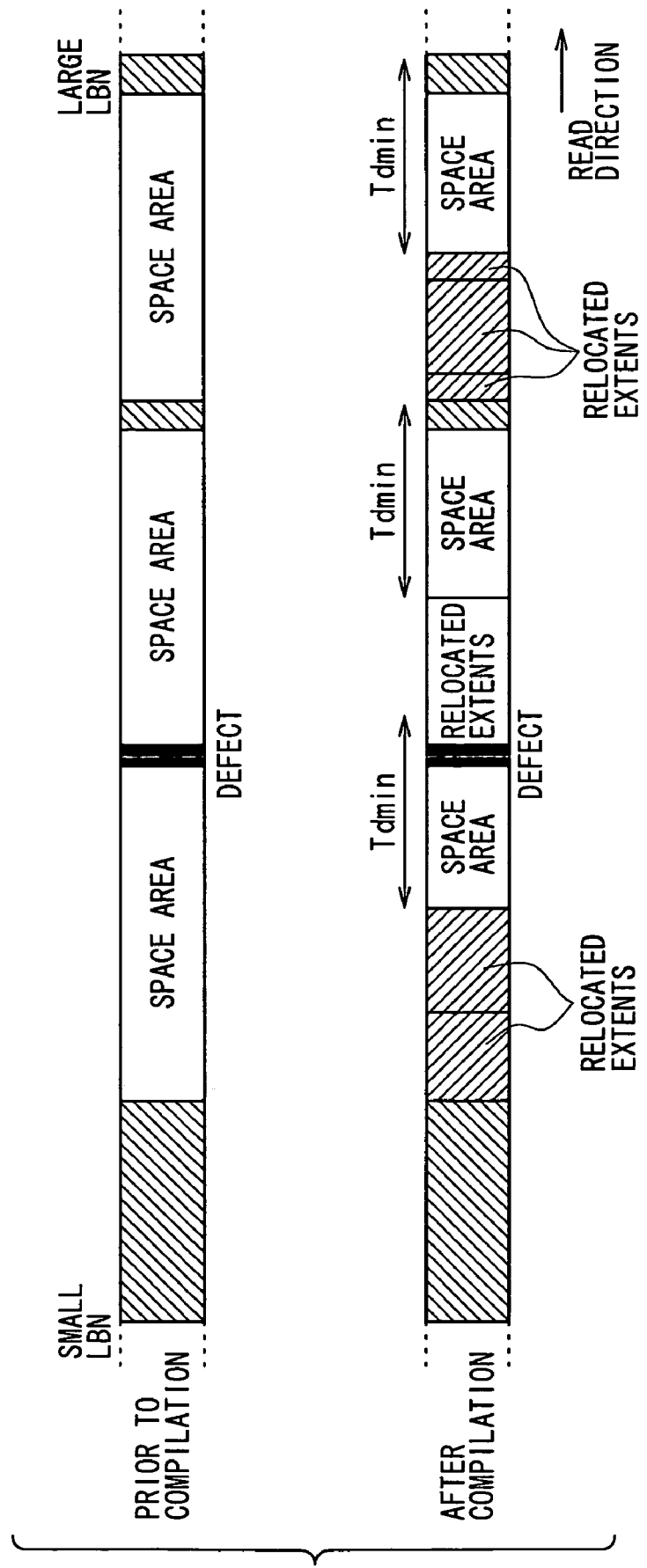
FIG. 17 is an explanatory diagram referred to in describing a method of determining a compilation end point in accordance with a first method.

In accordance with the first method, the total size of extents to be subjected to the compilation process is reduced as much as possible. Thus, the total size of extents relocated to the relocation area decreases. As a result, the time it takes to carry out the compilation process can be shortened. As shown in FIG. 17, however, as a result of allocating a small relocation area in a raw space area on the optical disc 32, a small space area having a shape resembling the so-called odd scrap may be left in the raw space area as a wasted area. In addition, since the total size of extents to be subjected to the compilation process is reduced by adoption of the first method, the amount of AV data left in the buffer 20 after a return seek operation is also small. Thus, it is more quite within the bounds of possibility that an underflow again occurs after the return seek operation. For this reason, it is also quite within the bounds of possibility that another compilation process is carried out. As a result, a small space area having a shape resembling the so-called odd scrap may be left in a raw space area as a wasted area conjointly with a small relocation area allocated in the raw space area on the optical disc 32 as described above. Such small wasted space areas will be scattered throughout the recording area of the optical disc 32.

In accordance with the second method, on the other hand, such extents to be subjected to a compilation process are determined that the extents have a total size as close as possible to a size of a contiguous recording space area selected as a relocation area. Thus, it is possible to avoid small free areas created wastefully by the first method. In addition, since the total size of extents relocated in accordance with the second method is large, the amount of AV data left in the buffer 20 after a return seek operation is also large. Thus, it is more somewhat out of the bounds of possibility that an underflow again occurs after the return seek operation.

Since the amount of AV data left in the buffer 20 after a return seek operation as a result of adoption of the second method may be too large, however, a wasteful compilation process may have been carried out.

Figure 18:
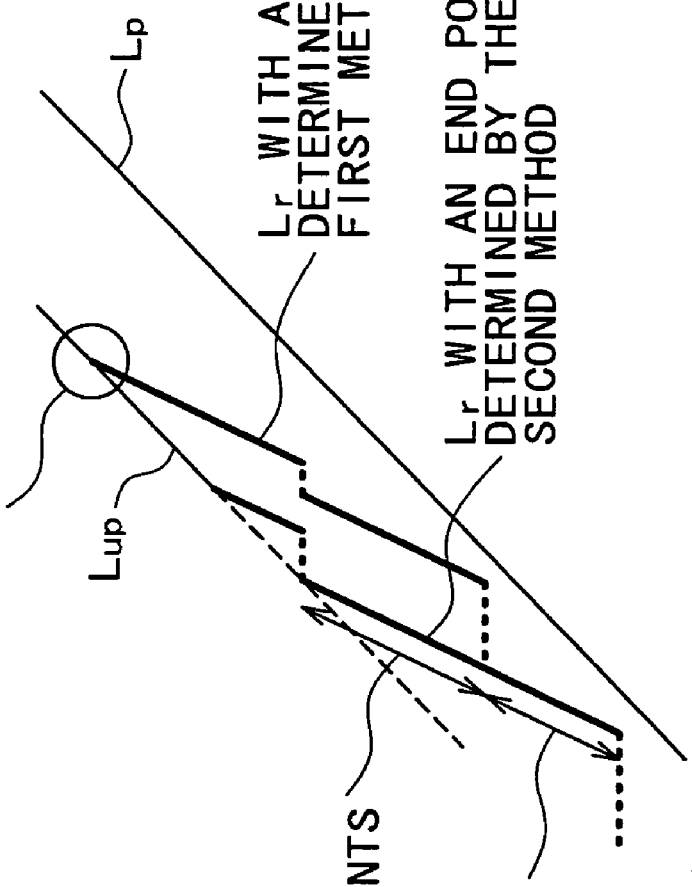
FIG. 18 is an explanatory diagram referred to in describing a method of determining a compilation end point in accordance with a second method.

In order to prevent a wasteful compilation process from being carried out due to adoption of the second method, the second method is actually implemented as follows. After the compilation process to determine a compilation end point in accordance with the first method is completed, extents are added to the relocation area and a new compilation end point is determined. If an overflow occurs in an operation to read out extents toward the compilation end point determined in the compilation process according to the first method, an overflow will certainly occur as well in an operation to read out the additional extents toward the new compilation end point determined in the compilation process according to the second method as shown in FIG. 18. Since an overflow occurs in an operation to read out extents toward the compilation end point determined in the compilation process according to the first method, it is not necessary to relocate new extents in accordance with the second method and add the new extents to extents relocated in the compilation process according to the first method.

Figure 19:
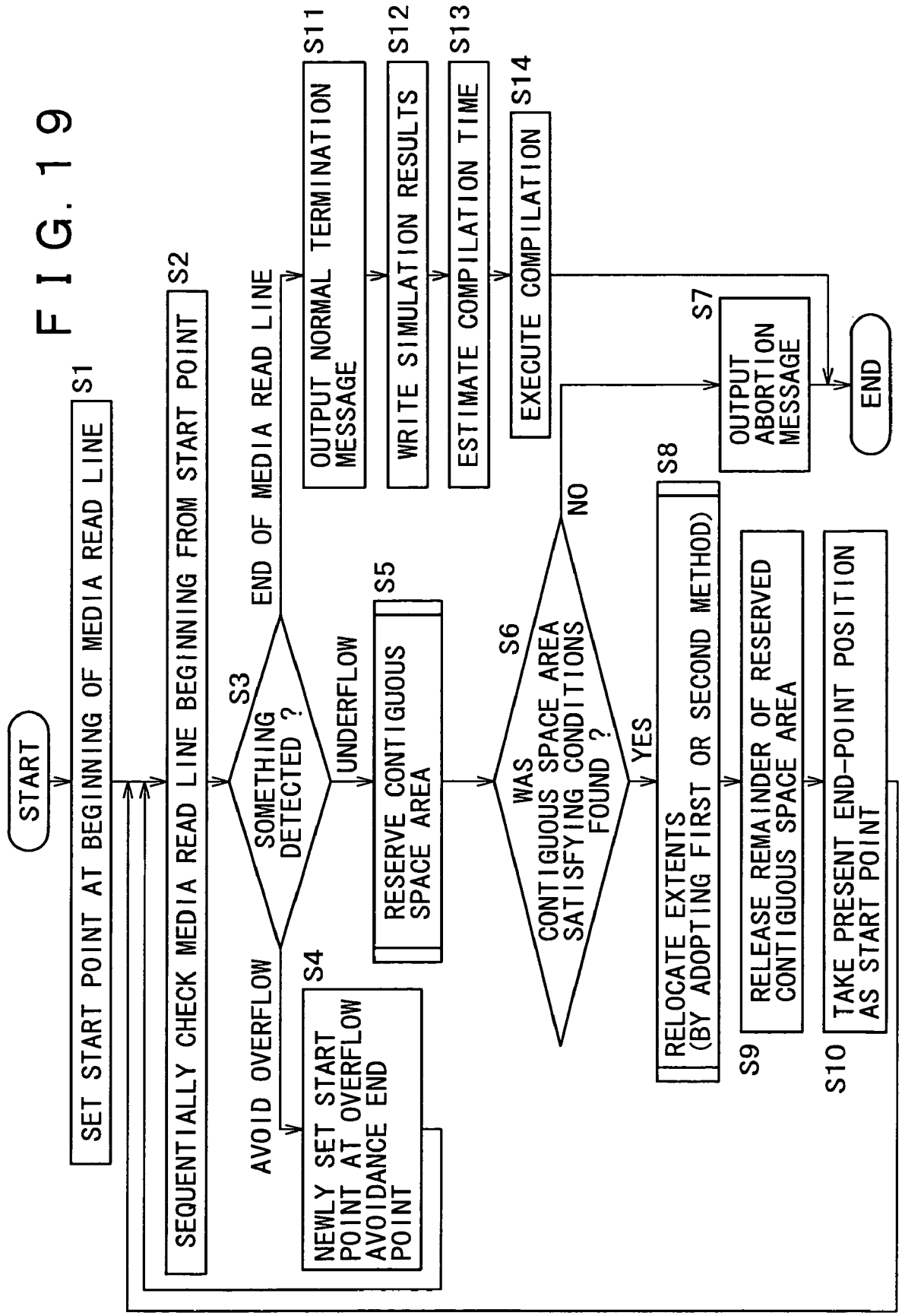
FIG. 19 is a flowchart referred to in explaining a compilation process.

Next, a compilation process carried out by the disc apparatus shown in FIG. 1 is explained by referring to a flowchart shown in FIG. 19.

The flowchart begins with a step S1 at which the real-time reproducibility determination unit 13 finds a media read line Lr, a real-time reproduction line Lp and a buffer upper-limit line Lup. The real-time reproducibility determination unit 13 then takes the head of the media read line Lr at a point of time of 0 as a compilation start point. Then, the flow of the compilation process goes on to a step S2.

It is to be noted that the media read line Lr found by the real-time reproducibility determination unit 13 at the step S1 is a media read line Lr preventing an overflow from occurring in the buffer 20 as shown in FIGS. 7 and 8.

At the step S2, the real-time reproducibility determination unit 13 checks the media read line Lr starting from the compilation start point in the lapsing direction of time for (avoidance of) an overflow and an underflow. If neither (avoidance of) an overflow nor an underflow is detected, the real-time reproducibility determination unit 13 checks the media read line Lr until the end point of the media read line Lr. Then, the flow of the compilation process goes on to a step S3.

At the step S3, the real-time reproducibility determination unit 13 finds out whether an overflow or an underflow has been detected in the operation started at the step S2 to check the media read line Lr, or the operation itself has been continued and completed at the end point of the media read line Lr.

If the finding of the step S3 indicates that an overflow has been detected in the operation to check the media read line Lr, the flow of the compilation process goes on to a step S4. At the step S4, the real-time reproducibility determination unit 13 takes or selects the point of time, at which the (avoidance) of the overflow is ended, as a new compilation start point. Then, the flow of the compilation process goes back to the step S2 to repeat the pieces of processing described above.

If the finding of the step S3 indicates that an underflow has been detected in the operation to check the media read line Lr, that is, AV data cannot be reproduced in a real-time manner with the present recording state of extents on the optical disc 32, the flow of the compilation process goes on to a step S5. At the step S5, the compile simulation unit 15 carries out a process to reserve a contiguous space area to be used as a relocation area. Then, the flow of the compilation process goes on to a step S6.

At the step S6, the compile simulation unit 15 finds out whether or not a contiguous space area satisfying requirements of a relocation area could be selected among space areas on the optical disc 32 in the processing carried out at the step S5. If the finding indicates that such a contiguous space area could not be detected, the flow of the compilation process goes on to a step S7. At the step S7, the compile simulation unit 15 outputs an abortion message to (or displays the abortion message on) the user I/F 11 by way of the system control unit 12 and abnormally ends the execution of the compilation process. The abortion message indicates that it is impossible to carry out a compilation process for assuring an operation to reproduce AV data in a real-time manner.

If the finding of the step S6 indicates that a contiguous space area satisfying requirements of a relocation area could be selected among space areas on the optical disc 32 in the processing carried out at the step S5, on the other hand, the flow of the compilation process goes on to a step S8 at which the compile simulation unit 15 carries out a simulation according to the first or second method described above to determine a compilation end point while relocating extents to the relocation area. Then, the flow of the compilation process goes on to a step S9.

At the step S9, the compile simulation unit 15 releases a space area remaining in the relocation area as a result of the processing carried out at the step S8 to relocate extents in the relocation area. Then, the flow of the compilation process goes on to a step S10. At the step S10, the compile simulation unit 15 takes the compilation end point determined at the step S8 as a new compilation end time. Then, the flow of the compilation process goes back to the step S2 to repeat the pieces of processing described above.

The processing carried out at the step S8 to relocate extents to the relocation area will provide a new media read line Lr different from the media read line Lr before this processing. For this reason, at the step S10, the new media read line Lr reflecting the extents relocated to the relocation area is found. Then, a compilation start point for the new media read line Lr is determined.

If the finding of the step S3 indicates that the real-time reproducibility determination unit 13 has checked the media read line Lr until the end point of the media read line Lr, the flow of the compilation process goes on to a step S11. At the step S11, the compile simulation unit 15 outputs a normal-completion message to (or displays the normal-completion message on) the user I/F 11 by way of the system control unit 12. The normal-completion message indicates that it is possible to carry out a compilation process for assuring an operation to reproduce AV data in a real-time manner. Then, the flow of the compilation process goes on to a step S12.

At the step S12, the compile simulation unit 15 writes information on a result of the simulation carried out at the step S8 to relocate extents in the relocation area into the simulation-result storage unit 16. Then, the flow of the compilation process goes on to a step S13.

At the step 13, the compile simulation unit 15 computes an estimated value of time, which it takes to actually carry out the compilation process, on the basis of the simulation-result information stored in the simulation-result storage unit 16.

An estimated value of the time it takes to actually carry out the compilation process to copy extents serving as an object of the compilation process to the relocation area can be found typically as a sum of a quotient obtained as a result of dividing the total size of the extents by the read rate Rr and a quotient obtained as a result of dividing the total size of the extents by a write rate. As described above, the read rate Rr is a rate at which the disc drive 2 reads out AV data from the optical disc 32. On the other hand, the write rate is a rate at which the disc drive 2 writes AV data into the optical disc 32.

If the compilation process is a process to transfer extents serving as an object of the compilation process to the relocation area, on the other hand, an estimated value of the time it takes to actually carry out the compilation process can be found typically as a sum of a quotient obtained as a result of dividing the total size of the extents by the read rate Rr, a quotient obtained as a result of dividing the total size of the extents by the write rate and a quotient obtained as a result of dividing the total size of the extents by an erase rate. The erase rate is a rate at which the disc drive 2 erases AV data from the optical disc 32. It is to be noted that, in general, the disc drive 2 erases AV data from the optical disc 32 not by actually deleting the AV data from the optical disc 32, but by renewing information on the AV data recorded on the optical disc 32. The information on the AV data recorded on the optical disc 32 is managed by using a file system. Thus, the disc drive 2 is capable of erasing AV data from the optical disc 32 instantaneously in comparison with the time it takes to read out or write AV data from or onto the optical disc 32. In other words, an estimated value of the time it takes to actually carry out the compilation process can be found without taking the erase rate into account, that is, by setting the time it takes to erase extents from the optical disc 32 at 0, without raising a problem.

Then, the compile simulation unit 15 outputs the value found at the step S13 as an estimated value of the time it takes to actually carry out the compilation process to (or displays the estimated value on) the user I/F 11 by way of the system control unit 12. Then, the flow of the compilation process goes on to a step S14. At the step S14, the compile execution unit 17 carries out a compilation process to actually relocate extents recorded on the optical disc 32 to the relocation area by referring to the simulation-result information stored in the simulation-result storage unit 16 so as to actually obtain the results of the simulation carried out by the compile simulation unit 15 at the step S8 to relocate the extents.

By referring to a flowchart shown in FIG. 20, the following description explains details of the processing carried out at the step S5 of the flowchart shown in FIG. 19.

As shown in FIG. 20, the flowchart begins with a step S21 at which the compile simulation unit 15 searches the media read line Lr starting from the compilation start point in the lapsing direction of time for a point serving as a left shoulder immediately preceding a first appearing underflow and takes the point as a tentative compilation start point, which is referred to hereafter simply as a tentative start point for the sake of convenience. Then, the flow of the processing goes on to a step S22.

As described above, at the step S21, the compile simulation unit 15 determines a tentative start point on the media read line Lr by searching the media read line Lr starting from the compilation start point. The compile simulation unit 15 receives the media read line Lr and the compilation start point from the real-time reproducibility determination unit 13 by way of the system control unit 12.

At the step S22, the compile simulation unit 15 finds a contiguous space area on the optical disc 32. The contiguous space area must satisfy the following conditions that: it have a size at least equal to the minimum assured size Sempty shown in FIG. 14, it allow a migration seek operation to the first logical block of the contiguous space area to be carried out without causing an underflow to interrupt reproduction of AV data, and it is closest to a location corresponding to the tentative start point.

Then, at the next step S23, the compile simulation unit 15 determines whether or not the processing carried out at the step S22 has found a contiguous space area on the optical disc 32 as a contiguous space area that has a size at least equal to the minimum assured size Sempty and allows a migration seek operation to the first logical block of the contiguous space area to be carried out without causing an underflow to interrupt reproduction of AV data. If a determination result obtained at the step S23 indicates that such a contiguous space area could not be found at the step S22, that is, if a contiguous space area that has a size at least equal to the minimum assured size Sempty and allows a migration seek operation to the first logical block of the contiguous space area to be carried out without causing an underflow to interrupt reproduction of AV data does not exists on the optical disc 32, the flow of the processing goes on to a step S24. At the step S24, the compile simulation unit 15 determines whether or not the compilation start point coincides with the tentative start point.

If a determination result obtained at the step S24 indicates that the compilation start point does not coincide with the tentative start point, the flow of the processing goes on to a step S25 at which the compile simulation unit 15 searches the media read line Lr starting from the present compilation start point in a direction opposed to the lapsing direction of time for a point serving as a first appearing left shoulder and takes this point as a new tentative start point. Then, the flow of the processing goes back to the step S22 to repeat the pieces of processing described above.

If a determination result obtained at the step S24 indicates that the compilation start point coincides with the tentative start point, that is, if a compilation start point allowing a migration seek operation to be carried out without causing an underflow to interrupt reproduction of AV data does not exist between an overflow and a first underflow appearing after the overflow, on the other hand, the flow of the processing goes on to a step S26 at which the compile simulation unit 15 writes a message to the simulation-result storage unit 16 as information on a result of the simulation. The result of the simulation indicates that an operation to reproduce AV data in a real-time manner is impossible. Then, control is returned to the calling program.

If the simulation-result information stored in the simulation-result storage unit 16 is a message indicating that an operation to reproduce AV data in a real-time manner is impossible, the determination result obtained at the step S6 of the flowchart shown in FIG. 19 will indicate that a contiguous space area satisfying the requirements of a relocation area could not be selected among space areas on the optical disc 32.

If a determination result obtained at the step S23 indicates that such contiguous space areas could be found at the step S22, that is, if contiguous space areas that each have a size at least equal to the minimum assured size Sempty and each allow a migration seek operation to the first logical block of the contiguous space area to be carried out without causing an underflow to interrupt reproduction of AV data exist on the optical disc 32, a contiguous space area found on the optical disc 32 as the contiguous space area closest to a location corresponding to the tentative start point should have been selected at the step S22. Then, the flow of the processing goes on to a step S27. At the step S27, the compile simulation unit 15 takes the present tentative start point as the compilation start time. Then, the flow of the processing goes on to a step S28.

At the step S28, the compile simulation unit 15 reserves the contiguous space area on the optical disc 32 as a contiguous space area closest to a location corresponding to the tentative start point. In other words, the compile simulation unit 15 virtually allocates this space area. As described above, this space area is selected among the space areas detected at the step S22 as space areas that each have a size at least equal to the minimum assured size Sempty and allow a migration seek operation to the first logical block of the space area to be carried out without causing an underflow to interrupt reproduction of AV data.

In this case, the determination result obtained at the step S6 of the flowchart shown in FIG. 19 will indicate that a contiguous space area satisfying the requirements of a relocation area could be selected among space areas on the optical disc 32.

Since a contiguous space area on the optical disc 2 is selected at the step S22 as a contiguous space area closest to a location corresponding to a tentative start point, the seek time of the migration seek operation is decreased. In addition, the tentative start point following the end point of (avoidance of) an overflow in the lapsing direction of time is selected as the compilation start point. Furthermore, the contiguous space area selected at the step S22 has a size at least equal to the minimum assured size Sempty. Thus, the number of seek operations occurring in a reproduction process according to a play list can be reduced. As a result, the buffering characteristic of the buffer 20 for storing AV data can be improved and the total sizes of all relocation areas reserved on the optical disc 32 can be reduced for economy purposes.

By referring to flowcharts shown in FIGS. 21A and 21B, the following description explains details of the processing carried out at the step S8 of the flowchart shown in FIG. 19.

It is to be noted that, at the step S8 of the flowchart shown in FIG. 19, a compilation end point is determined by adopting the first or second method.

First of all, by referring to the flowchart shown in FIG. 21A, the following description explains details of the processing carried out at the step S8 of the flowchart shown in FIG. 19 to determine a compilation end point by adopting the first method.

The flowchart shown in FIG. 21A begins with a step S31 at which the compile simulation unit 15 selects an extent immediately following a compilation start point as a compilation-object extent to be relocated to a space area reserved at the step S5 of the flowchart shown in FIG. 19. In the following description, the space area is referred to as a relocation-use space area for the sake of clarity. Then, the flow of the processing goes on to a step S32.

At the step S32, the compile simulation unit 15 (virtually) relocates the compilation-object extent to the head of the relocation-use space area. Then, the flow of the processing goes on to a step S33. At the step S33, the compile simulation unit 15 determines whether or not it is possible to carry out a return seek operation from the tail of the compilation-object extent, which has been relocated to the head of the relocation-use space area at the preceding step S32, without causing an underflow to interrupt reproduction of AV data. If the determination result obtained at the step S33 indicates that it is impossible to carry out a return seek operation from the tail of the compilation-object extent without causing an underflow to interrupt reproduction of AV data, that is, if the return seek operation from the tail of the compilation-object extent will inevitably cause an underflow to interrupt reproduction of AV data, the flow of the processing goes back to the step S31 at which the compile simulation unit 15 takes another extent to be reproduced after the previous extent, which has been selected as the compilation-object extent, as a new compilation-object extent. Then, the flow of the processing again goes on to the step S32. At the step S32, the compile simulation unit 15 (virtually) relocates the compilation-object extent to the relocation-use space area at a location immediately following the previous compilation-object extent. Then, the flow of the processing goes on to the step S33 to repeat the pieces of processing described above.

If the determination result obtained at the step S33 indicates that it is possible to carry out a return seek operation from the tail of the compilation-object extent without causing an underflow to interrupt reproduction of AV data, that is, if the return seek operation from the tail of the compilation-object extent will not cause an underflow to interrupt reproduction of AV data, on the other hand, the flow of the processing goes on to a step S34 at which the compile simulation unit 15 takes (or selects) the tail of an extent relocated last to the relocation-use space area as the compilation-end point. Then, control is returned to the calling program.

Next, by referring to the flowchart shown in FIG. 21B, the following description explains details of the processing carried out at the step S8 of the flowchart shown in FIG. 19 to determine a compilation end point by adopting the second method.

The flowchart shown in FIG. 21B begins with a step S41 at which the compile simulation unit 15 selects an extent immediately following a compilation start point as a compilation-object extent to be relocated to a space area reserved at the step S5 of the flowchart shown in FIG. 19. By the same token, in the following description, the space area is referred to as a relocation-use space area for the sake of clarity. Then, the flow of the processing goes on to a step S42.

At the step S42, the compile simulation unit 15 (virtually) relocates the compilation-object extent to the head of the relocation-use space area. Then, the flow of the processing goes on to a step 43. At the step S43, the compile simulation unit 15 determines whether or not the relocation-use space area still includes a remaining region with a size large enough for accommodating another extent to be reproduced after the previous extent, which has been selected as the compilation-object extent.

If a determination result obtained at the step S43 indicates that the relocation-use space area still includes a remaining region with a size large enough for accommodating another extent to be reproduced after the previous extent, which has been selected as the compilation-object extent, the flow of the processing goes on to a step 44 at which the compile simulation unit 15 determines whether or not an overflow will occur in the buffer 20 in the course of an operation to read out extents relocated to the relocation-use space area so far.

If a determination result obtained at the step S44 indicates that no overflow will occur in the buffer 20 in the course of an operation to read out extents relocated to the relocation-use space area so far, the flow of the processing goes back to the step S41 at which the compile simulation unit 15 takes another extent to be reproduced after the previous extent, which has been selected as the compilation-object extent, as a new compilation-object extent. Then, the flow of the processing again goes on to the step S42. At the step S42, the compile simulation unit 15 (virtually) relocates the compilation-object extent to the relocation-use space area at a location immediately following the previous compilation-object extent. Then, the flow of the processing goes on to the step S43 to repeat the pieces of processing described above.

If a determination result obtained at the step S43 indicates that the relocation-use space area no longer includes a remaining region with a size large enough for accommodating another extent to be reproduced after the previous extent, which has been selected as the compilation-object extent or, if a determination result obtained at the step S44 indicates that an overflow will occur in the buffer 20 in the course of an operation to read out extents relocated to the relocation-use space area so far, on the other hand, that is, if extents have been relocated to the relocation-use space area so that the extents can be read out from the relocation-use space area and stored in the buffer 20 as AV data of an amount large enough for preventing a reproduction process from being interrupted during the seek time of a return seek operation, on the other hand, the flow of the processing goes on to a sep S45. At the step S45, the compile simulation unit 15 takes (or selects) the tail of an extent relocated last to the relocation-use space area as the compilation-end point. Then, control is returned to the calling program.

As described above, parameters such as the buffer size B of the disc apparatus and the allowable reproduction delay time Tw are used as a basis for determining whether or not AV data can be reproduced in a real-time manner. If AV data cannot be reproduced in a real-time manner, extents are selected and relocated to a continuous space area used as a relocation area on the optical disc 32 in order to assure the operation to reproduce AV data in a real-time manner. In addition, it is possible to reduce the time it takes to carry out a compilation process to relocate extents to a relocation area and reduce the size of the relocation area to as small values as possible.

It is to be noted that a value output to the user I/F 11 as an estimated value of the compilation time at the step S13 of the flowchart shown in FIG. 19 changes in dependence on the buffer size B and the allowable reproduction delay time Tw. Thus, if the user is allowed to change the buffer size B and/or the allowable reproduction delay time Tw by operating the user I/F 11, for example, the user will be capable of making a decision on a trade-off among the buffer size B, the allowable reproduction delay time Tw and the estimated value of the time it takes to carry out a compilation process.

In the embodiment described above, after a value is output to the user I/F 11 as an estimated value of the compilation time at the step S13 of the flowchart shown in FIG. 19, a compilation process is carried out immediately at the next step S14. Instead of carrying out a compilation process immediately, however, it is possible to receive a command making a request for execution of a compilation process from the user as a command entered by the user in response to the value output to the user I/F 11 as an estimated value of the compilation time at the step S13, and a compilation process is carried out only if such a command is received.

FIG. 22 is a block diagram showing a typical configuration of another embodiment implementing a disc apparatus to which the present invention is applied. It is to be noted that, in this figure, components identical with their counterparts shown in FIG. 1 are denoted by the same reference numerals as the counterparts. In the following description, the explanation of the identical components is omitted properly though. That is to say, the disc apparatus shown in FIG. 22 has a configuration similar to that of the disc apparatus shown in FIG. 1 except that a recording medium 33 is newly added to the disc drive 2.

In the embodiment shown in FIG. 1, extents are relocated to a space area on the optical disc 32. In the case of the embodiment shown in FIG. 22, on the other hand, extents are relocated to the recording medium 33 other than the optical disc 32.

The recording medium 33 is another optical disc, a recording medium with a short seek time in comparison with the optical disc 32 or a recording medium requiring no seek operations. Examples of the recording medium with a short seek time are a HD (hard disc) and a semiconductor memory. In the case of the recording medium 33 used as a relocation area, the maximum seek time Tsmax described earlier by referring to FIG. 13 is sufficiently small or close to 0. Thus, the minimum assured size Sempty is also sufficiently small so that a compilation process for allocating extents can be carried out without using a relocation area having a large size. As a result, even if the first method is adopted as the technique for determining a compilation end point, it is possible to avoid a state in which a small space area having a shape resembling the so-called odd scrap is left in a relocation area as a wasted area as explained earlier by referring to FIG. 17.

The sequence of operations described above can be carried out in the recording/reproduction control unit 1 by using hardware or software. If the sequence of operations is carried out by using software, programs composing the software are installed in a general-purpose computer or the like.

FIG. 23 is a diagram showing a typical configuration of an embodiment implementing a computer for executing programs installed therein in order to carry out the sequence of operations described above.

Instead of installing the programs into the computer, the programs can be stored in advance in a recording medium embedded in the computer. Examples of the recording medium are a hard disc 105 and a ROM 103, which are both embedded in the computer.

As an alternative, the programs can also be temporarily or permanently stored (recorded) in a removable recording medium 111. Examples of the removable recording medium 111 are a CD-ROM (Compact Disc Read Only Memory) disc, an MO (Magneto Optical) disc, a DVD (Digital Versatile Disc), a magnetic disc and a semiconductor memory. Programs stored in a removable recording medium 111 are then presented to the user as the so-called package software to be installed in the computer.

It is to be noted that, instead of installing programs into a computer from a removable recording medium 111 described above, the programs can also be transmitted from a download site to the computer through radio communication by way of an artificial satellite used for digital satellite broadcasting or through wired communication by way of a network such as a LAN (Local Area Network) or the Internet. A communication unit 108 employed in the computer receives a program transmitted to the computer as described above and is capable of installing the program into the hard disc 105.

The computer has a CPU (Central Processing Unit) 102 embedded therein. The CPU 102 is connected to an input/output interface 110 by a bus 101. The user enters a command by operating an input unit 107 typically comprising a keyboard, a mouse and a mike. The CPU 102 receives the command coming from the input unit 107 by way of the input/output interface 110, executing a program stored in the ROM (Read Only Memory) 103 in accordance with the command. As an alternative, the program executed by the CPU 102 in accordance with the command may not be stored in the ROM 103 in advance. That is to say, the executed program can also be a program stored in advance in the hard disc 105 in advance and loaded into a RAM (Random Access Memory) 104 prior to execution. The executed program can also be a program transmitted to the computer from a satellite or a network, received by the communication unit 108, installed in the hard disc 105 in advance and loaded into the RAM 104 prior to execution. The executed program can also be a program read out from a removable recording medium 111 mounted on a drive 109, installed in the hard disc 105 in advance and loaded into the RAM 104 prior to execution. The drive 109 functionally corresponds to the disc drive 2 shown in FIGS. 1 and 22. The CPU 102 executes the program to carry out a process represented by any one of the flowcharts described above or a process in accordance with the configuration of any block diagram described earlier. Then, the CPU 102 outputs results of the executed process if necessary to an output unit 106 by way of the input/output interface 110. The output unit 106 typically comprises components including an LCD (Liquid Crystal Display) device and a speaker. As an alternative, the CPU 102 transmits the results to an external destination by way of the communication unit 108 or merely stores the results in the hard disc 105.

Steps composing each of programs executed to perform a variety of processes described in this specification are not necessarily carried out in accordance with an order set on a time base as a flowchart. Instead, a process may include pieces of processing to be carried out concurrently or individually. Pieces of processing to be carried out concurrently or individually are referred to as concurrent pieces of processing or processing implemented as objects.

A program can be carried out by one computer or a plurality of computers in a distributed-processing environment. In addition, a program may be transmitted to a remote computer to be executed thereby.

It is to be noted that, while an optical disc is used in the embodiments described above, the present invention can also be applied to a recording medium other than optical discs. An example of the other recording medium is a magnetic disc.

In addition, data recorded on the optical disc 32 is not limited to AV data. For example, data recorded on the optical disc 32 can be audio or video data only, or data of another kind.

In the embodiments shown in FIGS. 1 and 22 described above, the buffer 20 for buffering AV data read out from the optical disc 32 is provided in the recording/reproduction control unit 1. It is to be noted, however, that the buffer 20 can also be included in the disc drive 2 instead of being employed in the recording/reproduction control unit 1.

In addition, the present invention can be applied to not only an operation to reproduce a result of a non-destructive editing work, but also for example an operation to reproduce AV data recorded in segments separated from each other on the optical disc 32.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A data-processing apparatus comprising:
   a central processing unit;
   real-time reproduction determination means for determining whether or not data recorded in a first recording area can be reproduced in a real-time manner;
   data selection means for selecting data portions of said data recorded in said first recording area in case said data recorded in said first recording area cannot be reproduced in a real-time manner; and
   relocation means for relocating said data portions selected by said data selection means to a second recording area,
   wherein said data portions are relocated to the second recording area continuously in reproduction order independent of a seek operation, and
   wherein the relocated data portions is data starting with a relocation start point and ending with a relocation end point, the relocation end point being defined as a piece of data selected from a first piece of data and a second piece of data,
      wherein the first piece of data is defined as a piece of data to be read out from the first recording area at a point of time, at which data stored in a buffer has an amount large enough for assuring reproduction of said data in a real-time manner in an attempt to read out next data recorded in said first recording area to be reproduced after said data portions relocated to said second recording area, and
      wherein the second piece of data is defined as the end point of a last relocated data portion in the second recording area, if the second recording area does not include an area large enough for accommodating another data portion to be relocated, or is defined as a piece of data, which is to be stored in the buffer at a point of time an overflow would occur in the buffer.

2. The data-processing apparatus according to claim 1 wherein said first and second recording areas are recording areas on the same recording medium or different recording mediums.

3. The data-processing apparatus according to claim 1 wherein, if said data is read out from said first recording area or said second recording area and reproduced by storing into and reading out from a buffer, said real-time reproduction determination means determines whether or not said data can be reproduced in a real-time manner by finding out whether or not an underflow will occur in said buffer.

4. The data-processing apparatus according to claim 3 wherein, as the relocation start point to start relocation of said data portions to said second recording area, said data selection means selects a piece of data to be read out from said first recording area at a point of time satisfying conditions requiring that:
   said point of time shall precede an underflow point and shall be closest to said underflow point where said underflow point is defined as a point at which an underflow would otherwise occur in said buffer; and
   data stored in said buffer at said point of time shall has an amount large enough for assuring reproduction of said data in a real-time manner in an attempt to read out said data portions relocated to said second recording area.

5. The data-processing apparatus according to claim 4, further comprising:
   recording-area detection means for finding said second recording area allowing said data portions starting with said relocation start point and ending with said relocation end point to be relocated in said second recording area as a contiguous data portion.

6. The data-processing apparatus according to claim 1, further comprising:
   time estimation means for estimating time it takes to relocate said data portions to said second recording area.

7. A data-processing method comprising:
   a real-time reproduction determination step of determining whether or not data recorded in a first recording area can be reproduced in a real-time manner;
   a data selection step, which is executed for selecting data portions of said data recorded in said first recording area in case said data recorded in said first recording area cannot be reproduced in a real-time manner; and
   a relocation step of relocating said data portions selected at said data selection step to a second recording area,
   wherein said data portions are relocated to the second recording area continuously in reproduction order independent of a seek operation, and
   wherein the relocated data portions is data starting with a relocation start point and ending with a relocation end point, the relocation end point being defined as a piece of data selected from a first piece of data and a second piece of data,
      wherein the first piece of data is defined as a piece of data to be read out from the first recording area at a point of time, at which data stored in a buffer has an amount large enough for assuring reproduction of said data in a real-time manner in an attempt to read out next data recorded in said first recording area to be reproduced after said data portions relocated to said second recording area, and
      wherein the second piece of data is defined as the end point of a last relocated data portion in the second recording area, if the second recording area does not include an area large enough for accommodating another data portion to be relocated, or is defined as a piece of data, which is to be stored in the buffer at a point of time an overflow would occur in the buffer.

8. The data-processing method according to claim 7 wherein, said first and second recording areas are recording areas on the same recording medium or different recording mediums.

9. The data-processing method according to claim 7 whereby, if said data is read out from said first recording area or said second recording area and reproduced by storing into and reading out from a buffer, said real-time reproduction determination step is executed by determining whether or not said data can be reproduced in a real-time manner by finding out whether or not an underflow will occur in said buffer.

10. The data-processing method according to claim 9 whereby, as the relocation start point to start relocation of said data portions to said second recording area, said data selection step is executed to select a piece of data to be read out from said first recording area at a point of time satisfying conditions requiring that:
    said point of time shall precede an underflow point and shall be closest to said underflow point where said underflow point is defined as a point at which an underflow would otherwise occur in said buffer; and
    data stored in said buffer at said point of time shall has an amount large enough for assuring reproduction of said data in a real-time manner in an attempt to read out said data portions relocated to said second recording area.

11. The data-processing method according to claim 10, further comprising:

a recording-area detection step of finding said second recording area allowing said data portions starting with said relocation start point and ending with said relocation end point to be relocated in said second recording area as a contiguous data portion.

12. The data-processing method according to claim 7, further comprising:
a time estimation step of estimating time it takes to relocate said data portions to said second recording area.

13. A computer-readable medium storing a program to be executed by a computer for implementing a data-processing method comprising:
a real-time reproduction determination step of determining whether or not data recorded in a first recording area can be reproduced in a real-time manner;
a data selection step, which is executed for selecting data portions of said data recorded in said first recording area in case said data recorded in said first recording area cannot be reproduced in a real-time manner; and
a relocation step of relocating said data portions selected at said data selection step to a second recording area,
wherein said data portions are relocated to the second recording area continuously in reproduction order independent of a seek operation, and
wherein the relocated data portions is data starting with a relocation start point and ending with a relocation end point, the relocation end point being defined as a piece of data selected from a first piece of data and a second piece of data,
wherein the first piece of data is defined as a piece of data to be read out from the first recording area at a point of time, at which data stored in a buffer has an amount large enough for assuring reproduction of said data in a real-time manner in an attempt to read out next data recorded in said first recording area to be reproduced after said data portions relocated to said second recording area, and
wherein the second piece of data is defined as the end point of a last relocated data portion in the second recording area, if the second recording area does not include an area large enough for accommodating another data portion to be relocated, or is defined as a piece of data, which is to be stored in the buffer at a point of time an overflow would occur in the buffer.

* * * * *